United States Patent [19]

Firey

[11] 4,147,137

[45] Apr. 3, 1979

[54] ENGINE INTAKE STRATIFIER

[76] Inventor: Joseph C. Firey, 1554 NE. 95th. St., Seattle, Wash. 98115

[21] Appl. No.: 740,481

[22] Filed: Nov. 10, 1976

Related U.S. Application Data

[63] Continuation of Ser. No. 284425, Aug. 28, 1972, abandoned.

[51] Int. Cl.$^2$ .......................... F02b 19/10; F02b 19/16
[52] U.S. Cl. ................................. 123/32 ST; 123/127
[58] Field of Search ............... 123/127, 32 ST, 32 SP

[56] References Cited
U.S. PATENT DOCUMENTS

| | | | |
|---|---|---|---|
| 1,481,755 | 1/1924 | Burtnett | 123/32 ST |
| 1,537,748 | 5/1925 | Cole | 123/32 ST |
| 1,546,007 | 7/1925 | Burtnett | 123/32 ST |
| 3,170,445 | 2/1965 | Folcke | 123/32 ST |

*Primary Examiner*—Ronald B. Cox

[57] ABSTRACT

The devices of this invention, when used in combination with internal combustion engines of spark ignition type and/or compression ignition type, can create a multiregional stratification of the intake air-fuel mixture. By use of multiregional stratification at intake various beneficial objects can be achieved including the following: reduction of engine exhaust emissions of undesireable oxides of nitrogen, improvement of engine efficiency, reduction of engine noise, reduction of engine exhaust smoke, reduction of engine cost and others. The multiregional stratified air-fuel mixture is created by a stratifier valve which selects differing kinds of air-fuel mixtures in sequence from several different mixture creating channels. The resulting multiregional stratified mixture passes from the stratifier valve to the engine intake. Within the engine cylinder this subsequently compressed multiregional stratified mixture may be spark ignited, or compression ignited, or ignited by both spark and compression means.

44 Claims, 11 Drawing Figures

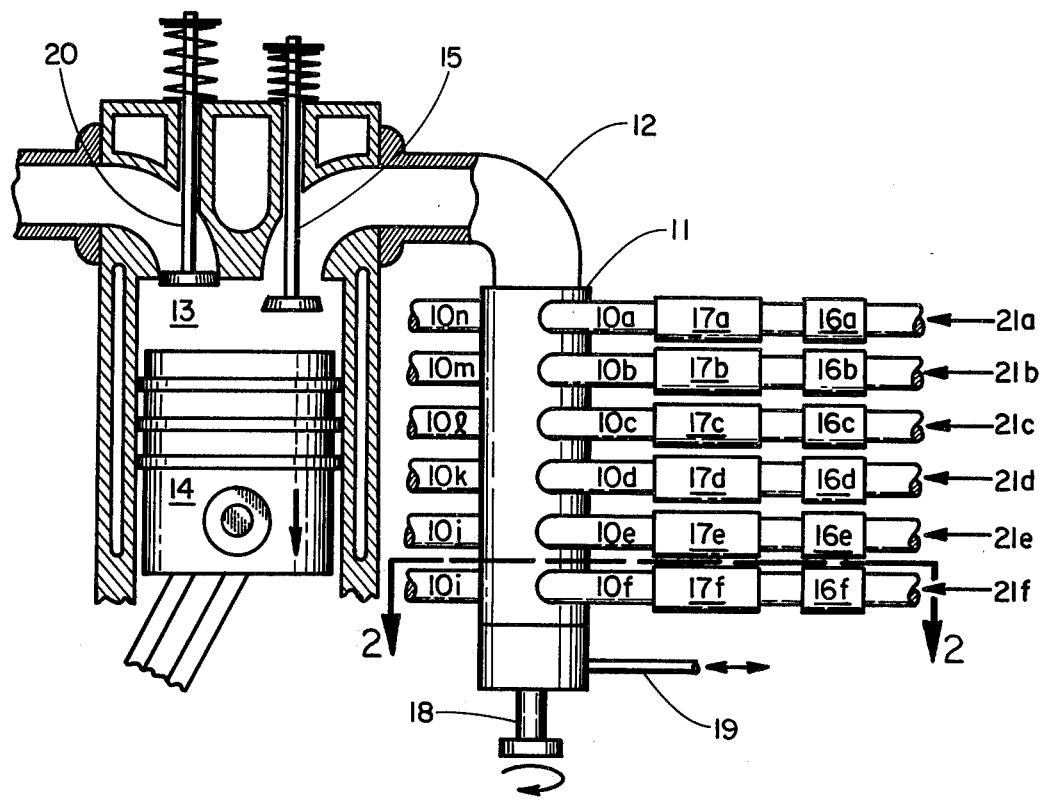
FIGURE 1
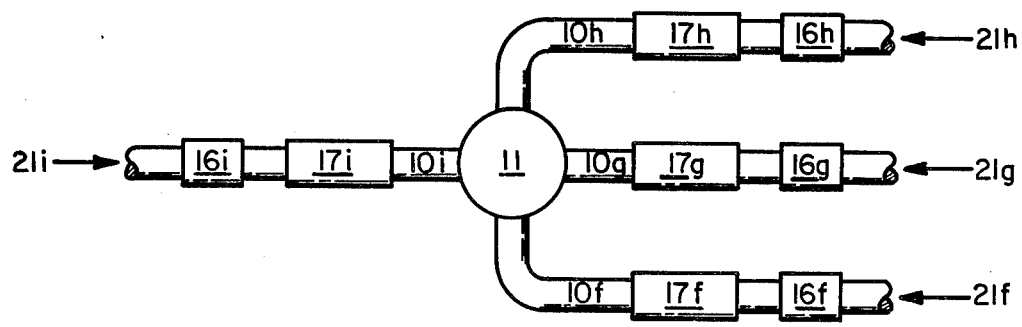
FIGURE 2. SECTION 2-2 OF FIGURE 1.

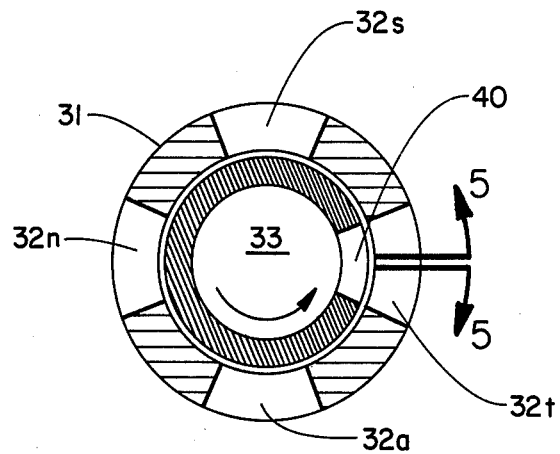
FIGURE 4. SECTION 4-4 OF FIGURE 3.
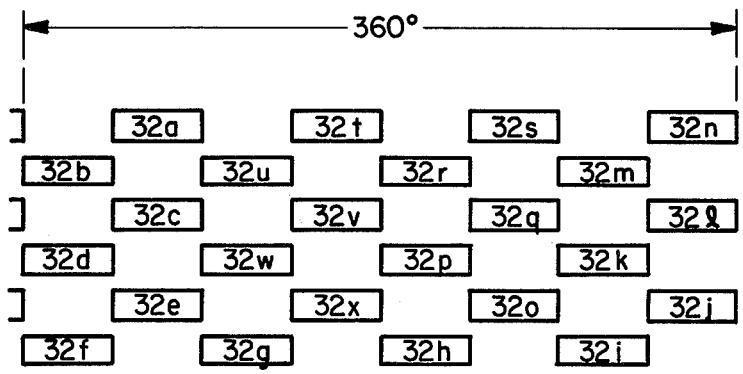
FIGURE 5. DEVELOPED ARC SECTION 5-5 OF FIGURE 4.

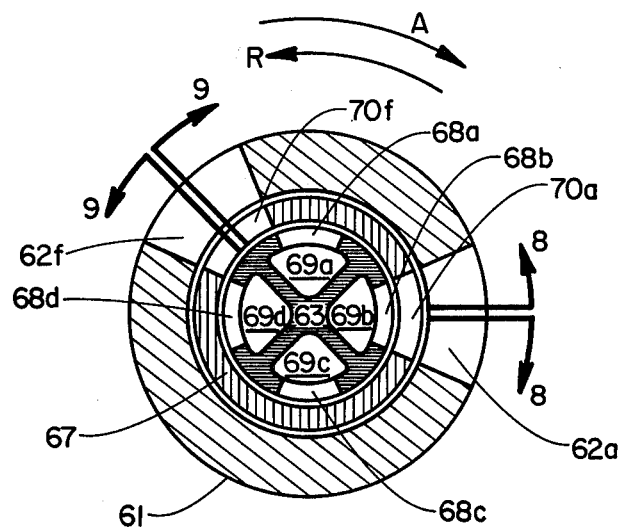
FIGURE 7. SECTION 7-7 OF FIGURE 6.

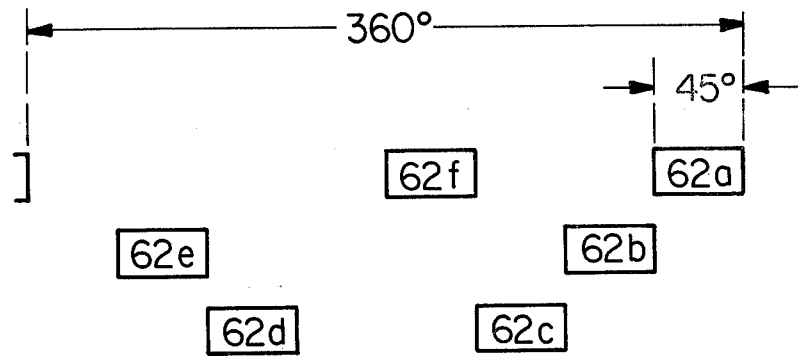
FIGURE 8. DEVELOPED ARC SECTION 8-8 OF FIGURE 7.
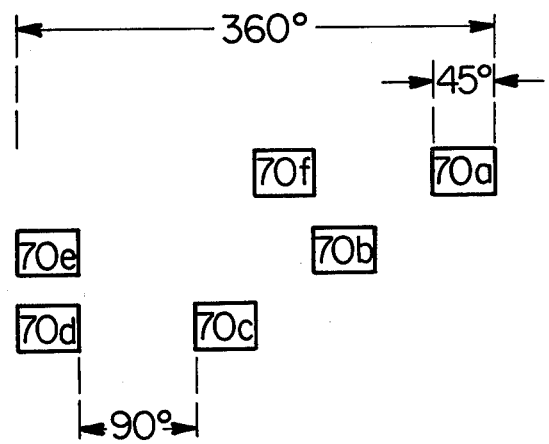
FIGURE 9. DEVELOPED ARC SECTION 9-9 OF FIGURE 7.

ENGINE INTAKE STRATIFIER

CROSS REFERENCES TO RELATED APPLICATIONS:

This application is a continuing application from my earlier filed application entitled, "Stratified Engine Intake Mixtures," Ser. No. 284425, abandoned Filing date Aug. 28, 1972.

BACKGROUND OF THE INVENTION

1. Field of the Invention

The field of this invention is internal combustion engines and, more specifically, such engines utilizing stratified air-fuel mixtures at the engine intake manifold and intake valve. Both spark ignition and compression ignition internal combustion engines are included.

2. Description of the Prior Art

Many spark ignition engines of the prior art have utilized stratified air-fuel mixtures at the engine intake manifold and/or intake valve (see for example references A, B, C, D, E, F). In these prior art, spark ignition, stratified mixture, engines, two kinds of air-fuel mixtures are utilized differing in the ratio of air to fuel, and any one kind of air-fuel mixture is contained within a single continuous region and is not broken up into several small regions separated from one another by regions of another kind. As a result whenever any portion of such a single continuous region is ignited by a spark, or any other ignition means, the entire region burns fully within a short time interval thereafter. This latter circumstance means compression ignition is impractical to use as a means of igniting these continuous regions, since compression ignition completes the burning of the entire region extremely quickly and strong pressure waves and an extremely loud engine noise are the consequence. Hence these prior art stratified mixture spark ignition engines can only use a spark or a flame from a spark for the igniting of the air-fuel mixture within the engine cylinder. As a result only those air-fuel mixtures which are spark ignitable or flame ignitable are used in these prior art stratified mixture engines. This type of engine intake stratification is hereinafter termed "two barrel carburetor stratification" since this is the most common manner of securing this type of stratification. In some cases of the prior art, in addition to one or two continuous air-fuel mixture zones as described above, an additional, continuous, air-only zone is also included in the stratified intake mixture. The term "two barrel carburetor stratification" is intended hereinafter to also include this type of intake stratification.

Experiments in engines show that air-fuel mixtures leaner in fuel than about 24 lbs. of air per lb. of fuel cannot be spark ignited (see for example reference 6) and that air-fuel mixtures leaner in fuel than about 27 lbs. of air per lb. of fuel cannot be flame ignited (see for example reference H). These then are the leanest mixtures useable in prior art, stratified mixture, spark ignition, engines.

The use of very lean mixtures is desired in order to reduce the undesireable exhaust emissions of oxides of nitrogen. Experiments in engines show these emissions to decrease as air-fuel mixtures leaner in fuel are supplied to the engine (see for example references I and J). For prior art, stratified mixture, spark ignition engines, this beneficial effect of leaner mixtures to reduce oxides of nitrogen can only be utilized up to the flame or spark ignition limit of mixture ratio described above.

Extremely lean mixtures, at least as lean as 45 lbs. of air per lb. of fuel, can readily be compression ignited (see for example references K and L) and in this way greater reductions of exhaust emissions of oxides of nitrogen can be achieved than is possible with prior art, stratified mixture, spark ignition engines. When, however, compression ignition is used with air-fuel mixtures premixed according to the prior art in the engine intake manifold, strong pressure waves and in consequence unacceptably loud engine noise are produced (see for example reference M).

The diesel engine has long used compression ignition, and of very lean overall air-fuel ratio, without creating excess engine noise. Admittedly a diesel engine is commonly somewhat noisier than a spark ignition engine but is nowhere near as noisy as a prior art spark ignition engine in which a large continuous portion of the mixture is being compression ignited. The reason why the diesel engine can use compression ignition without excess noise must be sought in the manner of creating the air-fuel mixture which is then compression ignited.

In the diesel engine the air-fuel mixture is not created in the intake manifold but rather by injecting the liquid fuel into the already compressed air in the cylinder only a short time before ignition. As a result the air-fuel mixture which is compression ignited is stratified, in a particular way, since there is not enough time between injection and compression ignition for this liquid fuel to first evaporate and then diffuse fully into the surrounding air mass. The particular kind of stratification obtained in a diesel engine is hereinafter referred to as "injected liquid spray" type of stratification of an air-fuel mixture. This injected liquid spray kind of stratification is obtained when a liquid fuel is injected under high pressure into an air mass and atomized into many separate liquid drops. Fuel evaporates from each drop and diffuses gradually into the surrounding air and thus creates a zone of air-fuel mixture around each drop. Within each such zone the full range of air-fuel ratios exists varying continuously all the way from, very fuel rich next to the liquid surface of the drop, to very fuel lean farthest away from the drop surface. The total number of fuel containing zones created is essentially equal to the number of liquid drops created by atomization. These many fuel containing zones are separate, discontinuous and essentially alike in having a wide range of air-fuel mixture ratios. In addition, one or more air-only zones may be created in those parts of the air mass into which no liquid fuel was injected. These evaporation and diffusion processes which create the injected liquid spray type of stratification are described in references N, O and P.

An air-fuel vapor mixture can be ignited by compressing it adequately within a piston and cylinder chamber. Ignition does not occur immediately upon compression but only after a compression ignition time delay interval whose length varies with the degree of compression, the air-fuel ratio of the mixture, and the type of fuel in the mixture (see for example reference Q). In contrast to spark ignition, compression can be used to ignite air-fuel vapor mixtures of almost any air-fuel ratio provided only that adequate compression is applied. Hence extremely lean air-fuel mixtures can be compression ignited which could not be spark ignited. The burning process which occurs after an air-fuel mixture is compression ignited occurs with extreme rapidity as shown in reference R. The mechanism of this extremely rapid burning is a subject of controversy at this time but, if it does take place via the travel of a burning zone through the air-fuel mixture, then there is general agreement that the velocity of travel of this burning zone must be of the order of several thousands of feet per second, a velocity roughly ten times faster than that of the normal, spark ignited flame. This extremely rapid burning and energy release from compression ignition creates strong gas pressure waves in the cylinder (see for example reference S) and, in consequence, a very loud engine noise.

The diesel engine uses only compression ignition of an air-fuel mixture created by the injected liquid spray technique as described heretofore. The strong pressure waves, characteristic of compression ignition, are generated separately in each ignition region around each fuel droplet and, not being coordinated between regions, these several individual pressure waves occur at different times and travel in different directions and do not act together to increase engine noise. A consequence of this time and position dispersed occurence of compression ignition in the diesel engine is that this engine is much quieter running than is a compression ignition engine utilizing a homogeneous, premixed air-fuel mixture. These latter engines are so noisy as to be unsuitable for any ordinary engine application. Hence we see that the combustion noise of compression ignition can be reduced to acceptable levels by having the compression ignition processes occur separately in individually small volume regions and at different times between regions.

In a diesel engine, after compression ignition has occurred, the unevaporated liquid fuel portions and the over-rich-in-fuel portions, present in each region of the stratified air-fuel mixture, burn only with difficulty and some of these portions become soot which survives to exhaust in the form of exhaust smoke, an undesirable exhaust emission of the diesel engine. The effects of fuel evaporating ability upon exhaust smoke emmissions of diesel engines is described in reference AA.

The most common type of spark ignition engine in use today, the gasoline engine, uses spark ignition in combination with a single barrel or two barrel carburetor for creating the air-fuel mixture. The resulting air-fuel mixture must be within the spark ignitability limits and in consequence engine torque is controlled by throttling the engine intake mixture. The result is a loss of engine efficiency due to the necessity of pumping out the exhaust gasses at full atmospheric pressure. The magnitude and deleterious effects of this pumping loss are described in reference U. The normal flame, started by spark ignition, cannot reach all the way to the chilled surfaces of the combustion chamber and the thin film of air-fuel mixture next to the surfaces of the combustion chamber fails to burn and emerges as unburned hydrocarbon emmissions in the engine exhaust. Although these undesirable emmissions can be reduced by increasing the air-fuel ratio, only limited improvements are available within the spark ignition inflammibility limits. These surface film effects on hydrocarbon emmissions are described in reference T and the effects thereon of air-fuel ratio are discussed in reference V. When the compression ratio of a gasoline engine is increased in order to increase the efficiency of the engine compression ignition of the last burning portions of the homogeneous air-fuel mixture may occur and the consequent locally rapid rate of pressure rise causes the undesirable noise known as knock. Although knock can be prevented by increasing the octane rating of the fuel being used such higher octane fuels are more difficult to prepare and thus are more costly to use. The compression ignition process of gasoline engine knock occurs in a single moderate sized volume of essentially uniform and homogeneous air-fuel mixture and hence the pressure wave, characteristic of compression ignition, is a single, strong pressure wave which greatly increases engine noise.

In a spark ignition engine, whose air-fuel mixture is stratified at the time of combustion by containing some air only regions or by containing some regions too lean for spark ignition, special ignition arrangements are sometimes needed to assure that spark ignition of the spark ignitable air-fuel mixture regions will take place at the proper time in the engine cycle. Various kinds of arrangements have been used in the prior art for this purpose including:

(1.) Locating the spark plug in the combustion chamber at a place where a spark ignitable region of the stratified air-fuel mixture is also located.

(2.) Using a long duration spark discharge when the stratified air-fuel mixture is moving.

(3.) Using two or more spark plugs (multiple spark plugs) located at different places in the combustion chamber.

To assure spark ignition of the spark ignitable regions requires only that a spark be present in the plug gap with the spark ignitable region also at the plug. In this way spark ignition of the spark ignitable regions can be secured by using one or a combination of the foregoing arrangements as is well known in the art.

That an air-fuel mixture, stratified in the engine intake manifold, will retain this stratification throughout the intake and compression processes, and thus be stratified at the time of combustion, can be shown in several ways of which the following are typical examples:

(a.) A four stroke cycle, spark ignition, single cylinder gasoline engine was supplied with gasoline from an injector valve, of diesel engine type, positioned in the intake manifold so as to spray liquid gasoline into the incoming intake air stream. Fuel was supplied under an atomizing pressure of 1000 psi to the injector valve by an injection pump, also of diesel engine type, actuated by the engine camshaft. The characteristic of this injection pump, like most diesel injection pumps, is to deliver the entire fuel quantity in about 10 to 20 degrees of crankshaft rotation (this being desirable for correct running of a diesel engine). The situation existing in the intake manifold of this engine is as follows: as the piston descends on the intake stroke, the air flows continuously through the intake manifold and into the cylinder during the entire 180 degrees of crankshaft rotation of the intake stroke, but the fuel is sprayed into this intake air mass in a brief spurt of only 10 to 20 crankshaft degrees, and in this way a stratified intake fuel-air mixture is created in the intake manifold. That air mass into which the fuel was sprayed becomes a fuel rich air-fuel mixture, whereas the other air portions are lean in fuel or free of fuel. The fuels tested were primary reference fuels (i.e., mixtures of normal heptane and iso-octane) whose boiling points lie between 209° F. and 210° F., and the intake air to the engine was heated to 300° F. Hence all fuel was evaporated and no liquid portions remained. The intake valve of the engine was fitted with a 180 degree shroud, oriented and fixed so as to direct the incoming air-fuel charge in a tangential flow direction within the engine cylinder. This arrangement of a shrouded intake valve to achieve tangential rotary motion of the air-fuel mixture within the engine cylinder is shown in FIGS. 2 and 3 of reference W. With these engine arrangements, a stratified intake mixture was created in the intake manifold, this mixture was then drawn into the cylinder in a manner to set the mixture into rotation within the cylinder; the stratified and rotating mixture was then compressed by the piston into the pancake-shaped combustion chamber.

If the mixture stratification, created in the intake manifold, failed to survive the intake and compression processes then the combustion in this test engine would not be changed in any way when the time of fuel injection into the intake manifold was changed to different portions of the intake stroke. But in these experiments the very opposite was found; the power, efficiency and knocking tendency of this engine were greatly changed when only the time of fuel injection into the intake manifold was changed to different portions of the intake stroke. At certain fuel injection timings the engine misfired since the rotating, and still stratified, air-fuel mixture in the combustion chamber had placed a mixture ratio, too lean for spark ignition, in front of the spark plug at the time of spark firing. The observed changes in power and efficiency with fuel injection timing change clearly demonstrate that the rotating air-fuel mixture in the engine combustion chamber had retained the stratification created in the intake manifold, which had thus survived the intake and compression processes.

(b.) Another engine experiment, similar in several ways to the foregoing example, is reported in reference X by Mr. J. Munot. The engine arrangements, fuel injection method, and intake stratifying technique of Mr. Munot are essentially the same as in the foregoing example except that the engine intake valve was not shrouded and the time of fuel injection into the engine intake manifold was not varied but remained fixed at 70 crankshaft degrees after piston top dead center during the intake stroke. Mr. Munot varied the overall air-fuel ratio, measured the engine power output, and observed that maximum engine power output occured at overall air to fuel weight ratios between about 15 to 1 and 21 to 1. As is well known in the art, maximum power air to fuel weight ratio lies between about 11 to 1 and 13 to 1 when the air-fuel mixture is uniform and not stratified. The very full lean air-fuel ratios for maximum power observed by Mr. Munot border in some tests on the spark ignitable range and can only be explained to be the result of a stratification of the air-fuel mixture, created in the intake manifold and retained through intake and compression processes up to the time of spark ignition and combustion.

(c.) In reference Y, Gau describes engine experimental results which demonstrate the general principal that stratification readily survives the pulsating flow conditions characteristic of internal combustion engines. Gan shows that stratification created by the combustion process survives the expansion and exhaust processes and is retained in the exhaust gases. In an engine exhaust system gas velocities and turbulence are much higher than in an engine intake system and shock waves and supersonic flow are additionally present. Hence the opportunities for mixing and elimination of stratification are much greater in the exhaust process than they are in the intake process. Thus if stratification can survive the exhaust process, as shown by Gau, it can readily survive the intake process in an internal combustion engine.

(d.) In reference Z, Jessel et al describe engine experiments which show that stratification existing at intake survives to combustion.

In summary, the foregoing description of that portion of the internal combustion engine prior art, relevant to this invention, shows the following:

(1.) Engine exhaust emissions can be reduced by use of leaner air-fuel mixtures.
(2.) With spark ignition, air-fuel mixtures leaner than about 24 to 1 or at most 27 to 1 cannot be used as these are not spark ignitable.
(3.) With compression ignition air-fuel mixtures at least as lean as 45 to 1 and probably leaner can be used.
(4.) Compression ignition of a uniform air-fuel mixture produces excessive engine noise.
(5.) The noise of compression ignition can be reduced to acceptable levels by so stratifying the air-fuel mixture that small volumes of air-fuel mixture are compression ignited at different times, producing a time and position dispersed occurence of compression ignition.
(6.) Control of spark ignition engine power output by throttling the flow of the intake air-fuel mixture increases the engine friction power loss and hence reduces efficiency.
(7.) The spark ignitable portions of a stratified air-fuel mixture can be spark ignited by proper spark plug location, by use of multiple spark plugs, by use of long duration spark discharge or by a combination of these methods.
(8.) If the engine air-fuel mixture is stratified in the intake manifold stratification is retained to the time of combustion.

SUMMARY OF THE INVENTION:

A beneficial object made available by this invention is to permit the use of higher compression ratios and the consequent obtaining of higher efficiency from spark ignition engines without excess increase of noise. Another beneficial object made available is to increase the part load efficiency of spark ignition engines by reducing the pumping work losses at intake. A further object is to reduce the quantities of undesirable smog generating materials, emitted via the engine exhaust, by making possible very lean mixture operation of the engine and by causing the combustion process to penetrate closer to the combustion chamber surfaces. For compression ignition engines a beneficial object made available by this invention is to reduce the quantities of unburned fuel, emitted as smoke, and thus to increase engine efficiency and reduce the emission of undesirable exhaust smoke. A further object of this invention is to provide a fueling method for compression ignition engines which is easier to construct and hence of lower cost than the fueling methods presently used for these engines.

These and other beneficial objects of this invention can be accomplished by use of the engine intake stratifier devices, described herein, in combination with internal combustion engines of spark ignition and/or compression ignition type. The engine intake stratifier devices create a stratified charge of air and fuel, entering the engine cylinder on each intake process, consisting of a large number of individual regions of air-fuel mixture. Each of these individual regions is of small volume, the weight ratio of air to fuel is essentially uniform throughout each region and the fuel type is essentially the same throughout each region. Adjacent regions differ in either the type of fuel or the air-fuel ratio or both. A stratified charge of air and fuel satisfying the foregoing requirements is hereinafter and in the claims referred to as a multiregional stratified air-fuel mixture or as an air-fuel mixture possessing multiregional stratification. In the earlier, cross referenced, application a multiregional stratified air-fuel mixture was referred to as a "multiply stratified" air-fuel mixture and the regions were referred to as "zones". The apparatus of this invention is used, in combinations with an internal combustion engine, as a replacement for the fuel supply, torque control and air-fuel mixing equipment of said internal combustion engine and is connected to the intake port of said engine as described hereinafter. The term "internal combustion engine" is used hereinafter and in the claims to mean the known combinations of cylinders, cylinder heads, pistons operative within said cylinders and connected to a crankshaft via connecting rods, valves and valve actuating means or cylinder ports, lubrication system, cooling system, ignition system if needed, flywheels, starting system, fuel supply system, fuel-air mixing system, intake pipes and exhaust pipes, torque control system, etc. as necessary for the proper operation of said internal combustion engine. The term "internal combustion engine" is used hereinafter and in the claims to include also the known combinations as described above but wherein the cylinders, cylinder heads, pistons operative within said cylinders and connected to a crankshaft via connecting rods, valves and valve actuating means or cylinder ports, are replaced by a rotary engine mechanism combination, comprising a housing with a cavity therein, end plates to enclose the cavity, a rotor operative within said cavity and sealing off separate compartments within said cavity and connecting directly or by gears to an output shaft, ports in said housing for intake and exhaust.

The devices of this invention can create a multiregional stratified air-fuel mixture by connecting a number of separate air-fuel mixing channels individually to a stratifier valve which connects in turn to the engine intake pipe. In each air-fuel mixing channel a particular type of air-fuel mixture is created by an air-fuel mixing device, such as a carburetor, followed by a heated section if needed to evaporate liquid fuel. The different channels produce different types of air-fuel mixture including an air only channel. These air-fuel mixtures may differ in the ratio of air to fuel and in the kind of fuel. The number of air-fuel mixing channels is equal to or greater than the number of different kinds of air-fuel mixture regions desired in the multiregional stratified air-fuel mixture at engine intake. The stratifier valve contains at least one fixed port for each of the air-fuel mixing channels. These several fixed ports index with the moving ports of the moving element of the valve in a sequence to produce the desired pattern of differing regions of air-fuel mixture in the multiregional stratified air-fuel mixture passing from the stratifier valve to the engine intake pipe. During the intake process of the engine cylinder air-fuel mixture is drawn into the intake pipe from the moving ports of the moving element of the valve and thus from one set of fixed ports at a time as indexed by the moving ports, in a sequence of such sets of fixed ports repeated with each full cycle of movement of the moving element, and hence from that certain group of fixed ports and their connected air-fuel mixing channels which is composed of all the fixed ports in the several sets of fixed ports indexed by the moving ports. The moving element of the stratifier valve may be shifted relative to the fixed ports so that a different certain group of fixed ports is indexed and in consequence a different pattern of regions is produced in the multiregional stratified air-fuel mixture. Alternatively an adjustable mask may be interposed between the fixed ports and the moving element of the stratifier valve to make available the same capability of changing the pattern of the differing regions in the multiregional stratified air-fuel mixture. The principle, though not the only, reason for changing the pattern of regions is to change the engine power output. By increasing the proportion of leaner mixture regions or air only regions the power output of the engine may be decreased. The moving element of the stratifier valve may be a ported cylinder rotated inside a hollow cylindrical fixed portion. Alternatively the moving element of the stratifier valve may be a sliding valve or a poppett type valve or any of several other kinds of valve. Where a single intake pipe is used for all cylinders of a multicylinder engine a single stratifier valve may be used connected to this single intake pipe. Where a separate intake pipe is used for each cylinder of a multicylinder engine, as for example when intake pipe tuning is used, a separate stratifier valve is required for each intake pipe. In this latter case the several air-fuel mixing channels may be common to all the separate stratifier valves. Any suitable and available power source may be used to drive the moving element of the valve. Usually the engine crankshaft or the engine camshaft, if accessible, will be the easiest power source to connect to the moving element of the stratifier valve. An electric motor, a vacuum motor or an air motor are other examples of possible suitable power sources for the driving of the moving element of the stratifier valve.

One method of using the devices of this invention in order to achieve certain of the beneficial objects of this invention consists in creating differences in the volumetric chemical energy content of the air-fuel mixtures supplied by different air-fuel mixing channels and in creating differences in the compression ignition time delay characteristic of the air-fuel mixtures supplied by different air-fuel mixing channels. Differences in volumetric chemical energy content can be created by setting the air-fuel mixing devices in different channels so that they furnish different proportions of air to fuel. Differences in the compression ignition time delay characteristic of the air-fuel mixtures supplied by different air-fuel mixing channels can be created in various ways as for example by one or a combination of the following methods already well known in the art:

1. Supply a separate fuel to each of several different channels, these several fuels differing in the kinds and proportions of hydrocarbons or other fuel components present.
2. Supply a separate fuel to each of several different channels, these several fuels differing in the amount or type of antiknock compound present.
3. Supply a separate fuel to each of several different channels, these several fuels differing in the amount or type of proknock compound present.
4. Adjust the air-fuel mixing devices in each of several different channels so that they furnish different proportions of air to fuel in the air-fuel mixtures supplied to the stratifier valve by these separate channels.

To control the torque output of the engine the torque control linkage adjusts the stratifier valve so that the moving element selects a higher proportion of the air only regions and lower chemical energy regions and a lower proportion of higher chemical energy regions as the control linkage is moved to lower engine torque settings. The ports in the moving element of the stratifier valve are arranged to index the fixed ports, connecting separately to the several air-fuel mixing channels, in a sequence such that adjacent regions in the multiregional stratified air-fuel mixture at intake differ in their compression ignition time delay characteristic.

When subsequently compressed this multiregional stratified fuel-air mixture can be both spark ignited and compression ignited. Those regions which are compression ignited do so at different times during combustion and the resulting pressure waves are scattered and out of phase with each other. As a result less combustion noise is created than is obtained from the systematic gas vibration obtained when non-stratified air-fuel mixtures are brought to such high compression ratios that compression ignition occurs. Compression ignition of some of the regions produces strong pressure waves which, in reflecting off the combustion chamber surfaces, will carry the combustion process closer to the cold surface than is done by the normal spark ignited flame. As a result the thin layer of unburned or incompletely burned air-fuel mixture next to the cold combustion chamber surface, left behind after combustion is complete, is reduced and the smog generating materials originating in this unburned layer are also reduced. To reduce engine power output the number of regions in the multiregional stratified intake air-fuel mixture, which are leaner than chemically correct and which are air only can be increased thus reducing the chemical energy available and hence the engine power output. This method of controlling engine power output reduces the pumping work lost in pumping the intake charge into the engine and the exhaust charge out of the engine, when compared to the usual intake manifold throttling method of controlling the power output of spark ignition engines. As is well known in the art, operation of a spark ignition engine at leaner air-fuel mixtures reduces the quantities of carbon monoxide and, if sufficiently lean, the oxides of nitrogen emitted via the engine exhaust. Hence the unusually lean mixture engine operation made possible by the devices of this invention can reduce the quantities of undesirable carbon monoxide and oxides of nitrogen emitted by an engine. In an engine using compression ignition only, the devices of this invention premix the air and fuel with the fuel being fully evaporated before ignition, and thus less soot will be formed during combustion following ignition than is the case for the usual liquid injection method of supplying fuel to these engines. Liquid injection produces a poorly mixed and incompletely evaporated fuel-air mixture at the time of ignition and incomplete fuel burning results, producing soot and exhaust smoke and a reduction of engine efficiency. These problems of the usual liquid injection method of fuel supply can be largely avoided by use of the devices of this invention.

The devices of this invention can create a multiregional stratified air-fuel mixture at engine intake and various beneficial objects can be achieved by utilizing this particular kind of stratification. Stratified air-fuel mixtures of the prior art, as described heretofore, are created by mechanically different devices, are of a different kind, and cannot be used to achieve the beneficial objects of this invention. The two barrel carburetor type of stratified air-fuel mixture consists of two regions, or at most three, and since these are of large volume compression ignition cannot be used and, in consequence extremely lean air-fuel mixtures cannot be used. Thus the exhaust emission reduction benefits, for example, available by use of the devices of my invention, cannot be achieved by use of two barrel carburetor methods of stratification. The injected liquid spray type of stratified air-fuel mixture contains many regions of small volume but within each region the full range of air-fuel ratios exists and in consequence soot and exhaust smoke are formed in the over rich and fuel only portions of each region. Thus the exhaust smoke elimination benefits for example, available by use of the devices of my invention, cannot be achieved by use of injected liquid spray methods of stratification. Two barrel carburetors of various types including those with air admission devices, injection carburetors of various types and cylinder fuel injectors of the diesel engine kind are well known in the art and are mechanically very different from the devices of this invention, for example, in not using a stratifier valve.

BRIEF DESCRIPTION OF THE DRAWINGS

In FIG. 1 are shown a four stroke cycle engine cylinder, 13, and piston, 14, with intake valve, 15, and intake pipe, 12. A stratifier valve, 11, connects to the intake pipe, 12, and also to the several air-fuel mixing channels, 10, equipped with heaters, 17, and air-fuel mixing devices, 16, such as a carburetor. The moving element, 18, of the stratifier valve, 11, is driven from some external power source such as the engine crankshaft or the engine camshaft.

In FIG. 2 is shown the cross sectional view 2-2 of the stratifier valve, 11, and air-fuel mixing channel, 10, portion of FIG. 1, in order to show that many different air-fuel mixing channels, 10a, 10b, 10c, 10d, etc., may be connected into a single stratifier valve, 11.

In FIGS. 3, 4, 5 is shown one particular form of the stratifier valve, 11, an example of the type referred to hereinafter as a variable port area valve, connected to the engine intake pipe, 12. FIG. 4 shows the cross sectional view, 4—4, of the FIG. 3 form of stratifier valve in order to show the fixed ports, 32, each of which connects to an individual air-fuel mixing channel, 10, and the moving port, 40, in the moving element of the valve, 33, which is rotated via the drive shaft, 34, and may also be adjusted axially via the rider, 38, which constitutes the throttle control for engine torque adjustment. FIG. 5 is the developed arc section, 5-5, of FIG. 4, which shows one pattern of arrangement of the several fixed ports, 32a, 32b, 32c, 32d, etc.

In FIGS. 6, 7, 8 and 9 is shown another particular form of the stratifier valve, 11, an example of the type referred to hereinafter as a variable port open time valve, connected to the engine intake pipe, 12. FIG. 7 shows the cross sectional view 7-7 of the FIG. 6 form of stratifier valve in order to show the fixed ports, 62, each of which connects to an individual air-fuel mixing channel, 10, the moving ports, 68, in the moving element, 63, and the adjustable ports, 70, in the mask element, 67. The moving element, 63, is rotated via the drive shaft, 64, and the mask element, 67, is adjustable by the linkage, 68, which constitutes the throttle control for engine torque adjustment. FIG. 8 is the developed arc section 8—8 of FIG. 7 which shows one pattern of arrangement of the several fixed ports, 62a, 62b, 62c, 62d, etc. FIG. 9 is the developed arc section 9—9 of FIG. 7, which shows one pattern of arrangement of the several adjustable mask ports, 70a, 70b, 70c, 70d, etc.

In FIG. 11 is shown an example of an energizing circuit for the solenoid, 109.

Figure 3:
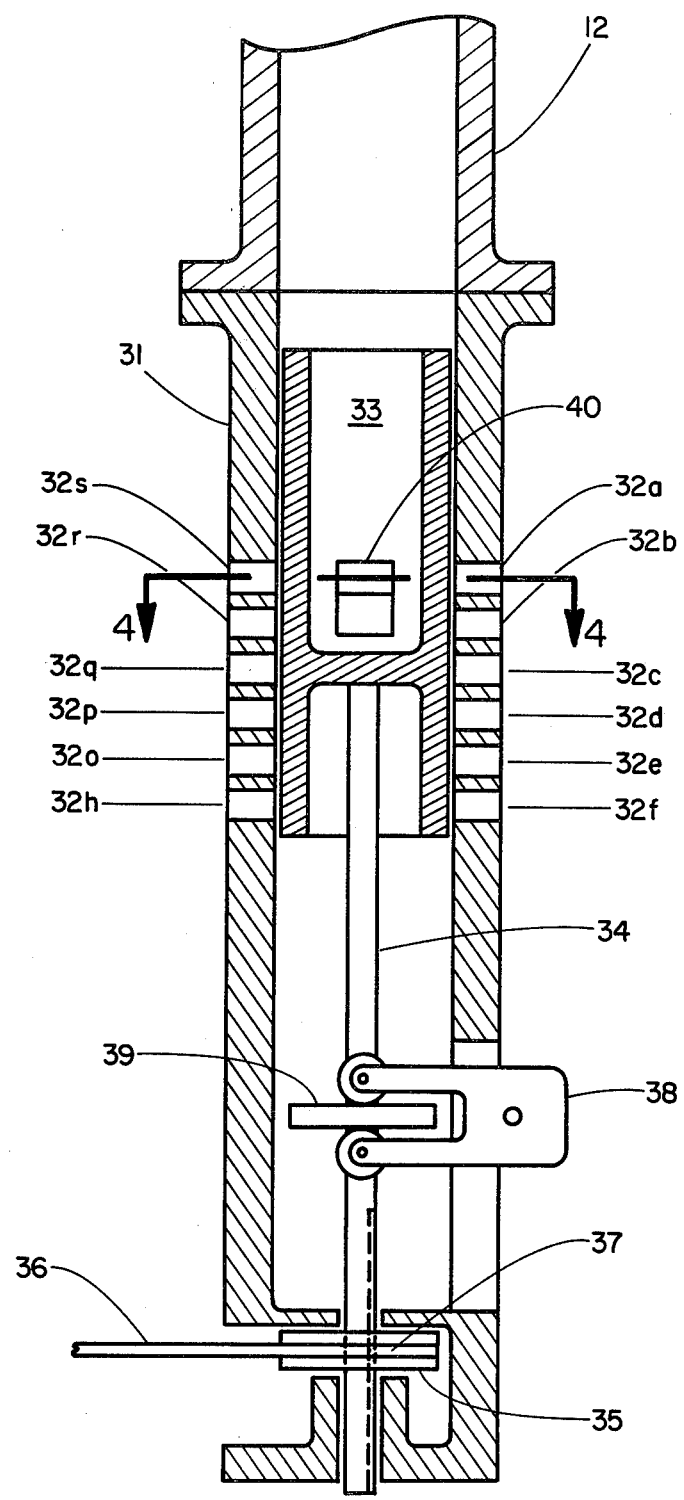

DESCRIPTION OF THE PREFERRED EMBODIMENTS:

One arrangement of the apparatus of this invention is shown in FIG. 1 and FIG. 2 wherein several separate air-fuel mixing channels, 10a, 10b, 10c, 10d etc., are each connected to a stratifier valve, 11, which connects to the engine intake pipe, 12, supplying the intake mixture to the engine cylinder, 13, and piston, 14, via the engine intake valve, 15, of a four stroke cycle engine. Each air-fuel mixing channel, 10, contains an air-fuel mixing device, 16, such as a carburetor or fuel injector, followed by a heated section, 17, to evaporate liquid fuel. These several separate air-fuel mixing channels, 10, may connect into the stratifier valve, 11, along its length as shown in FIG. 1 and around its periphery as shown in FIG. 2. Within the stratifier valve, 11, at least one fixed port is connected to each of the separate air-fuel mixing channels, 10. The moving element, 18, of the stratifier valve, 11, is driven from some external power source, such as the engine crankshaft or the engine camshaft, and contains moving ports which index with one set of fixed ports at a time in a sequence of such sets of fixed ports repeated with each full cycle of motion of the moving element. In this way the moving ports index sequentially with a certain group of fixed ports consisting of all the sets of fixed ports indexed during one full cycle of motion of the moving element. Details of the arrangements of the fixed and moving ports of the stratifier valve are described hereinafter in the detailed descriptions of several different forms of the stratifier valve, 11, which can be used in this invention. The moving element, 18, of the stratifier valve, 11, can be shifted relative to the fixed ports of the stratifier valve by the linkage, 19, in order to change the certain group of fixed ports with which the moving ports index and, in consequence, to change the pattern of differing regions produced in the multiregional stratified air-fuel mixture. In FIG. 1 the engine piston, 14, is shown descending on the intake stroke with the engine intake valve, 15, open and the engine exhaust valve, 20, closed. When, for example, the moving element, 18, of the stratifier valve, 11, has indexed a moving port with one of the fixed ports for the separate air-fuel mixing channel, 10a, during the intake stroke the descending piston, 14, draws air-fuel mixture via the intake pipe 12, from the separate air-fuel mixing channel 10a. During the time interval when the fixed and moving ports are indexed as described above air will enter the air-fuel mixing device, 16a, via the air pipe, 21a, and fuel will also enter this air-fuel mixing device via the fuel supply line, not shown in FIG. 1. The air-fuel mixing device, 16a, functions to mix the air and fuel together in the relative proportions desired for this channel and the heated section, 17a, evaporates liquid portions of the fuel supplied to this channel. In this way a region of air-fuel mixture, of the type created in the air-fuel mixing channel, 10a, is placed into the intake mixture going into the engine cylinder. Shortly thereafter motion of the moving element, 18, causes the moving ports to cease indexing with the fixed ports for the separate air-fuel mixing channel, 10a, and to index instead with the fixed ports for another separate air-fuel mixing channel. This latter channel will then place a region of air-fuel mixture, of the type created in this latter channel, into the intake mixture going into the engine cylinder in the same way as described above for channel 10a. The continued motion of the moving element of the stratifier valve thus places a pattern of differing regions of air-fuel mixtures into the net intake mixture going into the engine cylinder by indexing the moving ports in sequence with various fixed ports in the stratifier valve. The multiregional stratified air-fuel mixture thus created by the stratifier valve, 11, passes through the intake pipe, 12, and the engine intake valve, 15, into the engine cylinder, 13, without essential alteration except a small degree of mixing and interdiffusion of fuel molecules at the boundaries between adjacent regions. The pattern of differing regions of air-fuel mixture within the multiregional stratified air-fuel mixture thus placed within the engine cylinder is also retained, without essential alteration, during the subsequent compression stroke of the engine piston, 14, and it is this multiregional stratified mixture which is spark ignited and/or compression ignited at or near the end of the compression stroke of the engine. The several regions of air-fuel mixture within the multiregional stratified air-fuel mixture may differ from one another in the kinds of fuels present in the regions and in the weight ratio of air to fuel in the regions. Where two regions are to differ in the kinds of fuels present, the desired two different kinds of fuels are supplied separately from their respective tanks via the fuel supply lines to the two separate air-fuel mixing devices, 16, in those two air-fuel mixing channels, 10, which create these two regions. Where two regions are to differ in the weight ratio of air to fuel, the air-fuel mixing devices, 16, are adjusted to mix air and fuel in the desired differing ratios in those two air-fuel mixing channels, 10, which create these two regions. Two regions may differ in their weight ratio of air to fuel but contain the same kinds of fuel, or, alternatively, two regions may differ in both their weight ratio of air to fuel and in the kinds of fuels present. In most cases it will prove desirable for control of engine power that at least one of the air-fuel mixing channels, 10, supply air only, that is a weight ratio of air to fuel of infinity, and no fuel line or air-fuel mixing device, 16, is needed for this channel. The available number of different types of regions is equal to the number of air-fuel mixing channels, 10. Only for a constant torque engine application would all of these available regions be in use at one time or at one condition of engine operation. In the more general case of the variable torque engine application, different patterns of regions would be utilized for different torque requirements, these different patterns being determined by the group of fixed ports which the moving ports index in the stratifier valve, 11. The group of fixed ports which the moving ports index in the stratifier valve, 11, is changed by shifting the moving element, 18, relative to the fixed ports of the stratifier valve via the linkage, 19. Hence, in the more general case of the variable torque engine only a portion of the available regions will be in use at any one torque setting of the engine. As engine torque requirement is reduced the linkage, 19, shifts the moving element, 18, relative to the fixed ports of the stratifier valve, 11, in such a manner that a larger portion of the regions, in the multiregional stratified air-fuel mixture going into the engine cylinder, are air only regions and lean mixture regions in which the weight ratio of air to fuel is appreciably more than the chemically correct ratio for complete fuel combustion. By thus reducing the total quantity of fuel entering the engine cylinder the available chemical energy of combustion and hence the available torque of the engine are reduced in order to match the reduced torque requirement.

Although the number of different types of regions in the multiregional stratified air-fuel mixture placed within the engine cylinder, 13, for any one engine cycle is at most equal to or, more usually, less than the number of air-fuel mixing channels, 10, as described above, the total number of regions in the multiregional stratified mixture may have any value desired as set by the number and arrangement of ports and the rotating or cycling speed of the moving element, 18, in the stratifier valve, 11. Each active moving port may index with a number, n, of fixed ports during each revolution or cycle of the moving element, 18, in the stratifier valve. If the moving element, 18, has a number, m, of active moving ports then the total number of regions created with each revolution or cycle of the moving element is the product n × m. If the ratio of engine crankshaft rotational speed, Ne, to the rotational speed or cycling speed, Nv, of the moving element, 18, in the stratifier valve is designated, $r_v = N_e/N_v$, then the total number of regions, Z, in the multiregional stratified air-fuel mixture placed within the engine cylinder, 13, for any one engine cycle is equal to the following:

$$Z = (n \times m / 2 r_v)$$

If the number of air-fuel mixing channels, 10, being actively used at any particular setting of the moving element, 18, relative to the fixed ports of the stratifier valve, 11, is designated C, then if Z exceeds C some of the total number of regions will be of the same type, having been drawn through the same air-fuel mixing channels. Hence the multiregional stratified air-fuel mixture placed within the engine cylinder, 13, for any one engine cycle is seen to have two regional dimensions; the number of different types of regions, D, having a maximum value of C, and the total number of regions, Z. We note also that the value of C can never exceed the number of air-fuel mixing channels, 10, and, for the more common, variable torque engine application, will be less than the number of channels, 10. As explained heretofore the intensity of noise created by the compression ignition and combustion of a multiregional stratified air-fuel mixture within the engine cylinder for any one engine cycle may be reduced by increasing the number, D, of different types of regions and also by increasing the total number of regions, Z, provided a suitable selection is chosen for the ignition and combustion properties of the several regions.

The apparatus of this invention is shown in FIGS. 1 and 2 for a single cylinder engine but the invention can be readily adapted to multicylinder engines. If a single intake pipe, 12, is used to supply all cylinders of a multicylinder engine a single stratifier valve may be used, connected to this intake pipe as shown in FIG. 1. If a separate intake pipe, 12, is used for each cylinder of a multicylinder engine a separate stratifier valve is used, one for each cylinder. In this latter case the several air-fuel mixing channels, 10, may be commonly connected to all the stratifier valves.

The apparatus of this invention is shown in FIGS. 1 and 2 for a four stroke cycle engine but the invention can be readily adapted to two stroke cycle engines. For two stroke cycle engines the intake pipe, 12, is connected to the scavenging blower inlet, if such is used, or to the crankcase inlet port, if crankcase scavenging is used.

Any suitable and available power source may be used to drive the moving element, 18, of the stratifier valve, 11. An electric motor, an electric solenoid plus spring and switch type motor, an air motor, the engine crankshaft and the engine camshaft are examples of suitable power sources for the driving of the moving element, 18. Usually the engine crankshaft or the engine camshaft will be the preferable power source and may be connected to drive the moving element, 18, by gears, chains, timing belts or plain belts. For many engine applications the ratio $r_v$, of engine crankshaft rotational speed, Ne, to the rotational or cycling speed, Nv, of the moving element, 18, need not be exactly constant and a constant speed ratio drive may not be required, particularly if the moving element speed, Nv, is appreciably greater than engine crankshaft speed, Ne, that is if the ratio, $r_v$, has a very small value. For some engine applications a fixed value of the ratio, $r_v$, may be preferred and gear, chain or timing belt drive of the moving element, 18, from the crankshaft or camshaft would then be used. An example of an engine application wherein such a fixed ratio drive would be used is an engine using a shrouded intake valve in order to secure a definite and repeatable placement of the several regions within the combustion chamber relative to the spark plugs.

The foregoing portions of the detailed description of the invention describe the essential apparatus features of the invention and the following descriptions of FIGS. 3, 4, 5, 6, 7, 8, 9, 10 and 11 describe several particular mechanical arrangements for the stratifier valve, 11, portion of the invention.

One form of the stratifier valve, corresponding to components 11 and 18 of FIG. 1, is shown in FIG. 3 with a cross sectional view, 4—4, shown in FIG. 4 and a developed arc section, 5—5, shown in FIG. 5 to illustrate one arrangement of the fixed ports of this stratifier valve. The FIG. 3 form of stratifier valve is an example of a variable port area valve wherein the area of fixed port uncovered by the moving port may be varied by shifting the moving element relative to the fixed ports. This variable port area stratifier valve contains a housing, 31, connecting at its outlet end to the engine intake pipe, 12, and containing several fixed ports, 32a, 32b, 32c, 32d, etc., which connect at their inlets separately to the several separate air-fuel mixing channels, 10a, 10b, 10c, 10d, etc. The moving element of the valve, 33, corresponding to component 18 of FIG. 1, is rotated within the housing, 31, via its drive shaft, 34, which latter is driven in turn by the wheel, 35. The wheel, 35, is shown in FIG. 3 as being belt driven via the belt, 36, from a wheel on the engine crankshaft or the engine camshaft, but could alternatively be gear driven or chain driven from the same or other power source. The wheel, 35, is connected to the drive shaft, 34, with a sliding key or sliding spline, 37, so that the drive shaft, 34, may be moved relative to the wheel, 35, along their common centerline of rotation. The rider, 38, acting on the collar, 39, fixed to the drive shaft, 34, can move the drive shaft, 34, along its centerline of rotation and hence can shift the moving element, 33, and its moving port, 40, relative to the fixed ports, 32. The rider, 38, corresponds to the linkage, 19, of FIG. 1, and, in most variable torque engine applications will constitute the throttle control for engine torque adjustment. The outer periphery of the moving element, 33, is large enough and long enough to always cover and seal all of the fixed ports, 32, except those indexed with the moving port, 40, for all available positions of the moving element, 33, along its centerline of rotation as set by the rider, 38. As shown in FIG. 3 the moving element, 33, is positioned by the rider, 38, so that the moving port, 40, whose height encompasses two fixed ports, fully indexes the group of fixed ports containing the two topmost levels of fixed ports, 32t, 32r, 32s, 32m, 32n, 32b, 32a, 32u and in that sequence for the direction of motion shown in FIG. 4 for the moving element, 33, and for the fixed port designations and arrangement shown in FIG. 5. During one revolution of the moving element, 33, its single moving port, 40, with m=1, indexes with eight fixed ports, 32, that is n=8, and eight regions are created per revolution when the moving element is positioned as shown in FIG. 3. If the moving element, 33, is moved downward by the rider, 38, along its centerline of rotation a distance equal to half the height of a fixed port in this direction, the moving port, 40, will then index the three topmost levels of fixed ports, 32t and 32v, 32r, 32s and 32q, 32m, 32n and 32l, 32b, 32a and 32c, 32u and in that sequence, two ports such as 32t and 32v being simultaneously indexed on every other indexing interval, a single port such as 32r, being indexed between such intervals. Twelve regions are seen to be created per revolution at this latter setting of the moving element but the two regions created simultaneously while the moving port is indexing two fixed ports are each smaller in volume than the single region created while the moving port is indexing one fixed port since the flow area of each of the two ports is reduced by half. It is evident from FIGS. 3, 4 and 5 and the foregoing descriptions thereof that the variable port area stratifier valve shown in FIG. 3 creates either eight regions per revolution, whenever the moving port, 40, exactly indexes fully with two levels of fixed ports, 32, or twelve regions per revolution, whenever the moving port, 40, is not indexed exactly with two levels of fixed ports, 32, for all positions of the moving element, 33, relative to the fixed ports, 32.

If the rider, 38, is to be the engine torque control and is set at maximum torque as positioned in FIG. 3, then, engine torque is to decrease as the rider, 38, and hence the moving element, 33, are moved downward toward the driving wheel, 35. For this particular example, then, the proportion of air only regions and lean mixture regions in the multiregional stratified air-fuel mixture pasing out of the stratifier valve is to increase as the rider and moving element, 33, move downward. This result can be obtained by connecting a larger proportion of the lower levels of fixed ports, the levels coexistent with ports 32d, 32e and 32f, into air-fuel mixing channels, 10, which create lean mixtures having high weight ratios of air to fuel, and which create air only mixtures. A smooth variation of engine torque with position of the rider, 38, can be obtained by gradually increasing the proportion of fixed ports at each level which connect to air only channels and also by gradually increasing the air-fuel ratio of the channels connected at each level, in the downward direction in which the moving element is adjusted to decrease engine torque. In this way the proportion of air only regions and lean mixture regions, in the multiregional stratified air-fuel mixture created by the stratifier valve, will increase as the rider, 38, and the moving element, 33, are moved downward in the direction to reduce engine torque.

The stratifier valve shown in FIG. 3, and described above, is only one example of a variable port area stratifier valve and it is not intended to limit this invention to this single example. Many different kinds of variable port area stratifier valves can be used to achieve the objects of this invention, as will be evident to a person skilled in the art, differing from the example shown in FIG. 3 in many ways such as, the number and arrangement of fixed ports, the number and arrangement of moving ports, the manner in which the moving port moves relative to the fixed ports, the manner of driving the moving element of the valve, etc.

Figure 6:
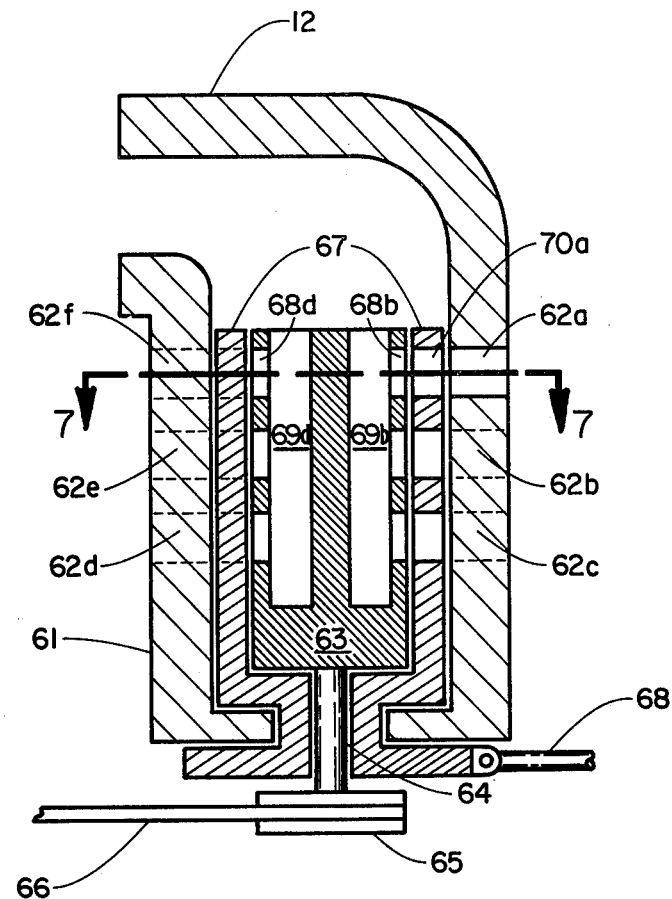

Another form of the stratifier valve, corresponding to components 11 and 18 of FIG. 1, is shown in FIG. 6 with a cross sectional view, 7—7, shown in FIG. 7, a developed arc section, 8—8, shown in FIG. 8, to illustrate one arrangement of the fixed ports of this stratifier valve, and another developed arc section, 9—9, shown in FIG. 9, to illustrate one arrangement of the ports in the adjustable mask element interposed between the moving element and the fixed ports of this stratifier valve. The FIG. 6 form of stratifier valve is an example of a variable port open time valve wherein the time interval during which a particular fixed port is indexed with a moving port may be varied by adjusting the mask element relative to the fixed ports. This variable port open time stratifier valve contains a housing, 61, connecting at its outlet end to the engine intake pipe, 12, and containing six fixed ports, 62a, 62b 62c, 62d, 62e and 62f, which connect at their inlets separately to six separate air-fuel mixing channels, 10a, 10b, 10c, 10d, 10e and 10f, and which are positioned circumferentially and axially relative to one another as shown in FIG. 8, the developed arc section 8—8, of FIG. 7. As shown in FIG. 8, each port and each portless gap encompasses 45 degrees of circumferential arc. The moving element of the valve, 63, corresponding to component 18 of FIG. 1, is rotated within the housing, 61, via its drive shaft, 64, and the wheel, 65. The wheel, 65, is shown in FIG. 6 as being belt driven via the belt, 66, from a wheel on the engine crankshaft or the engine camshaft, but could alternatively be gear driven or chain driven from the same or other power source. An adjustable mask, 67, is interposed between the housing, 61, and the moving element, 63, so as to be rotatively adjustable about the centerline of rotation of said moving element by means of the linkage, 68. As shown in the cross sectional view of FIG. 7, the moving element, 63, contains twelve moving ports, 68a, 68b, 68c, etc., these ports being positioned symetrically in groups of three of 90 degree intervals in the circumferential direction of the moving element, the three ports of each group being aligned parallel to the centerline of rotation of the moving element and being spaced along this alignment so as to index exactly with the three levels, 62a, 62b, and 62c, of the fixed ports in the housing. Each group of three moving ports gives access from the fixed ports, 62, into a separate passage, 69a, 69b, 69c, and 69d within the moving element, 63, these four separate passages connecting together at the outlet end of the moving element, 63, and to the engine intake pipe, 12. The mask, 67, contains six adjustable ports, 70a, 70b, 70c, 70d, 70e and 70f, which are positioned circumferentially and axially relative to one another as shown in FIG. 9, the developed arc section 9—9 of FIG. 7, and which are positioned axially so as to align exactly in an axial direction with the three levels, 62a, 62b, and 62c of the fixed ports in the housing and thus to align similarly with the three levels of moving ports, 68, in the moving element, 63. As shown in FIG. 9 each port and each portless gap encompasses 45 degrees of circumferential arc except the portless gap between ports 70c and 70d which encompasses 90 degrees of circumferential arc. The linkage, 68, corresponds to the linkage, 19, of FIG. 1, and in most variable torque engine applications will constitute the throttle control for engine torque adjustment. The outer diameter of the moving element, 63, is fit to the inner diameter of the mask, 67, so as to cover and seal all of the mask ports, 70, except those indexed with the moving ports, 68. Correspondingly the outer diameter of the mask, 67, is fit to the inner diameter of the housing, 61, so as to cover and seal all of the fixed ports, 62, except those indexed with the mask ports, 70. As shown in FIG. 6 and FIG. 7 the mask, 67, is positioned by the linkage 68, so that the mask port, 70a, indexes with the fixed port, 62a, and the mask port, 70f, indexes with the fixed port, 62f, all other fixed ports being closed and sealed by the mask 67. For this arrangement only the top four moving ports, 68a, 68b, 68c, and 68d, are active, hence $n=4$, and only the two fixed ports, 62a and 62f, are indexable and in consequence eight regions are created when the moving element, 63, makes one revolution in the direction R shown on FIG. 7, these eight regions being of the two types created in the air-fuel mixing channels, 10a and 10f, connected to the fixed ports, 62a and 62f, respectively. If the mask, 67, is adjusted in the direction A shown on FIG. 7 through an arc of 22½ degrees from the position shown in FIG. 7, mask port 70a and fixed port 62a, mask port 70b and fixed port 62b, mask port 70e and fixed port 62e, and mask port 70f and fixed port 62f will be respectively indexed, but over only half of a full port arc, all other fixed ports being closed and sealed by the mask. For this arrangement the top four moving ports, 68, and the second level of four moving ports, 68, are active, hence $n=8$, and the four fixed ports, 62a, 62f, 62b and 62e are indexable and in consequence thirty two regions are created when the moving element, 63, makes one revolution in the direction R shown in FIG. 7, these thirty two regions being of the four types created in the air-fuel mixing channels, 10a, 10f, 10b and 10e, connected to the fixed ports 62a, 62f, 62b, and 62e, respectively. For this arrangement the fixed ports are indexed in the sequence; 62a and 62b together, 62a and 62e together, 62f and 62e together, and 62f and 62b together. Each of these thirty two regions is but one fourth the volume of each of the eight regions created by the arrangement shown in FIG. 7 since the duration of indexing of any one fixed port has been halved and the flow rate through any one fixed port is also halved since two fixed ports are concurrently open. If the mask, 67, is adjusted in the direction A shown on FIG. 7 through an arc of 45 degrees, from the position shown in FIG. 7, mask port, 70b, will index with fixed port, 62b, and mask port, 70e, will index with fixed port, 62e, all other fixed ports being closed and sealed by the mask, 67. For this arrangement only the second level of four moving ports, 68, are active and again eight regions are created when the moving element, 63, makes one revolution in the direction R, these eight regions being of the two types created in the air-fuel mixing channels, 10b and 10e, connected to the fixed ports, 62b and 62e, respectively. Because the fixed ports, 62, are asymmetrical, the mask, 67, can only be usefully adjusted over an arc of 90 degrees in the direction A shown on FIG. 7 from the position shown in FIG. 7 for this one example of a variable port open time stratifier valve. As the mask, 67, is adjusted through this useful adjustment arc of 90 degrees, from the position shown in FIG. 7, the number of regions created changes from eight to thirty two to eight to thirty two and finally back to eight. Correspondingly the types of regions vary from two, created in channels 10a and 10f, to four, created in channels 10a, 10f, 10b and 10e, to two, created in channels 10b and 10e, to four, created in channels 10b, 10e, 10c and 10d, and finally back to two, created in channels 10c and 10d. If the mask, 67, is set by the linkage, 68, for maximum engine torque, as positioned in FIG. 7, then engine torque is to decrease as the mask, 67, is adjusted through the useful adjustment arc of 90 degrees in the direction A shown in FIG. 7. This result can be accomplished, for example, by making air-fuel mixing channel, 10d, connected to fixed port, 62d, an air only channel, by making air-fuel mixing channel, 10a, connected to fixed port, 62a, a best power air-fuel ratio channel and by making the other air-fuel mixing channels progressively leaner in fuel than channel 10a in the order, 10f, 10b, 10e and 10c. In this way the net fuel content and hence the net chemical energy content, of the multiregional stratified air-fuel mixture created by the stratifier valve will decrease as the mask, 67, is rotated, from the position shwon in FIG. 7, through the useful adjustment arc of 90 degrees and hence the engine torque will decrease correspondingly, as desired. The stratifier valve shown in FIG. 6 and FIG. 7, and described above, is only one example of a variable port open time stratifier valve and it is not intended to limit this invention to this single example. Many different kinds of variable port open time stratifier valves can be used to achieve the objects of this invention, as will be evident to a person skilled in the art, differing from the example shown in FIGS. 6 and 7 in many ways such as, the number and arrangement of fixed ports, the number and arrangement of mask ports, the number and arrangement of moving ports, the manner in which the moving port moves relative to the fixed ports, the manner of driving the moving element of the valve, etc.

Figure 10:
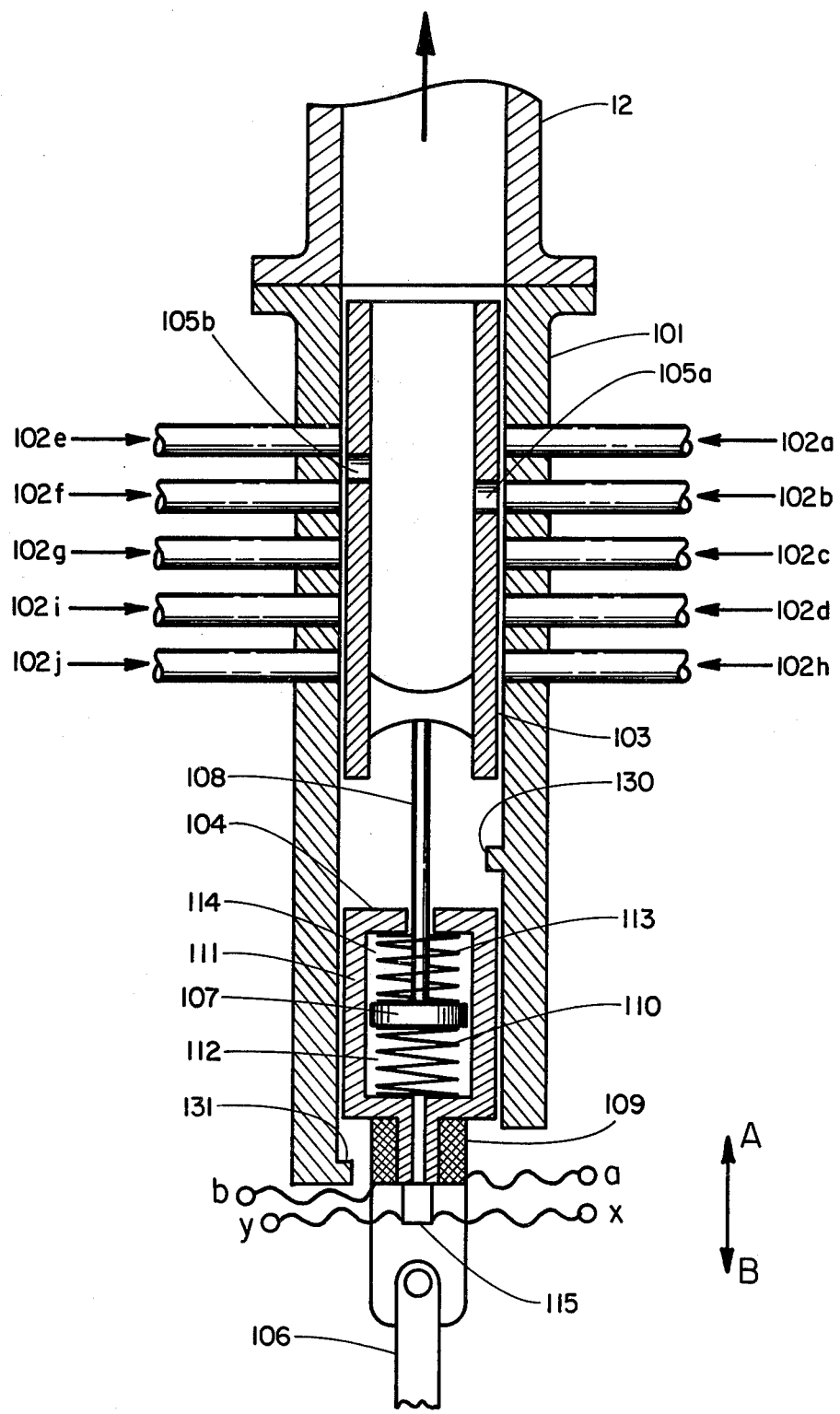
In FIGS. 10 and 11 is shown another particular form of the stratifier valve, 11, an example of the type referred to hereinafter as a variable port area and variable port open time valve, connected to the engine intake pipe, 12. The moving element, 103, is vibrated back and forth by the action of the magnetic piston, 107, the solenoid, 109, and the springs, 110 and 113. The mean position of the moving element, 103, can be adjusted by the linkage, 106, which constitutes the throttle control for engine torque adjustment. The fixed ports, 102a, 102b, 102c, etc. connect at their inlets separately to air-fuel mixing channels, 10a, 10b, 10c, etc.

A third form of the stratifier valve, corresponding to components 11 and 18 of FIG. 1, is shown in FIG. 10. The FIG. 10 form of stratifier valve is an example of a variable port area and variable port open time valve wherein the time interval during which a particular fixed port is indexing with a moving port and the port area opened during such indexing may both vary when the moving element is shifted relative to the fixed ports. This variable port area and port open time valve contains a housing, 101, connecting at its outlet end to the engine intake pipe, 12, and containing fixed ports, 102a, 102b, 102c, etc., which connect at their inlets separately to separate air-fuel mixing channels, 10a, 10b, 10c, etc. The moving element of the valve, 103, corresponding to component 18 of FIG. 1 is oscillated back and forth along its axis of symmetry within the housing, 101, by the electric solenoid plus spring and switch type motor, 104, herein referred to as a solenoid motor. The moving element, 103, contains two separate ports, 105a and 105b, which alternately connect the housing outlet to different fixed ports, 102b, 102f, 102c, 102g, etc., as the moving element oscillates along its axis of symmetry. The solenoid motor, 104, oscillates the moving element, 103, through a cycle of essentially constant amplitude whose position of mid travel is herein referred to as the mean position of the moving element, 103. The driving portion of the solenoid motor, 104, can be adjusted, in the direction of the axis of symmetry of the moving element, 103 by the linkage, 106, corresponding to component, 19, of FIG. 1. The mean position of the driven magnetic piston, 107, of the solenoid motor is fixed with respect to the driving portion of the solenoid motor, 104, and, hence, adjustment of the driving portion of the solenoid motor correspondingly adjusts the mean position of the driven magnetic piston, 107, and the mean position of the moving element, 103, which connects directly to the driven magnetic piston through the drive bar, 108. The average amplitude of oscillation of the moving element, 103, about its mean position is determined by: the spring constants of the two springs, 110 and 113; the mass of the moving element, 103, together with that of the drive bar, 108, and the magnetic piston, 107; the magnetic field strength of the solenoid, 109, when energized; the size of the air volumes, 112 and 114; and the actuation limits of the pressure switch, 115; and can thus be preset, by design of these components, to any desired valve. When the engine is to be used for a variable torque application, the average amplitude of oscillation of the moving element, 103, is made less than the greatest distance between any two fixed ports, 102, along the axis of oscillation of the moving element, 103, and preferably appreciably less. The average amplitude of oscillation of the moving element, 103, is made greater than the minimum distance between any two fixed ports, 102, along said axis of oscillation and preferably sufficient that at least four different fixed ports, 102, are in use. The fixed ports, 102, and the moving ports, 105, are so spaced along the axis of oscillation of the moving element, 103, that at least one fixed port is at least indexed and hence opened to a moving port at all times that the amplitude of oscillation of the moving element lies within that portion of the axis of oscillation which contains the fixed ports, 102. This can be accomplished in several ways, for example, as shown in FIG. 10, by making fixed port and moving port lengths along the axis of oscillation equal, by spacing the two moving ports, 105a and 105b, one port length between port centers along said axis, by spacing adjacent fixed ports, such as 102a and 102b, two port lengths between port centers along said axis, and by aligning each fixed port indexable with one moving port, 105a, coaxially, along a centerline at right angles to the axis of oscillation, with one fixed port indexable with the other moving port, 105b. The sealing length of the moving element, 103, within the housing, 101, is made sufficiently long that the fixed ports, 102, are opened to the engine intake pipe, 12, only by the moving ports, 105, at all torque settings and vibration amplitudes of the moving element.

The manner of controlling the engine torque by adjustment of the means position of the moving element, 103, via the linkage, 106, can be illustrated with the following specific example for the particular form of stratifier valve shown in FIG. 10, and described above. With a designed maximum amplitude of oscillation of the moving element, 103, equal to four port lengths along the axis of oscillation and a designed minimum amplitude of oscillation equal to at least three port lengths, the moving ports, 105, will index with and open at most four and at least three fixed ports, 102. The full torque throttle stop, 130, is located so that when the solenoid motor, 104, is against this full stop the moving ports, 105, index with and open at most the fixed ports, 102a, 102b, 102e, 102f. The idle torque throttle stop, 131, is located so that when the solenoid motor, 104, is against this idle stop the moving ports, 105, index with and open at most the fixed ports, 102d, 102h, 102i, 102j. The several air-fuel mixing channels, 10, are so connected to the fixed ports, 102, that the air-fuel mixtures become leaner in fuel in the order, 102a, 102b, 102c, 102d, 102h and also in the order, 102e, 102f, 102g, 102i, 102j, with fixed ports 102i and/or 102h supplied with air only. With these arrangements the multiregional stratified air-fuel mixture created by the stratifier valve of FIG. 10 will contain an increasing fuel quantity and chemical energy as the linkage, 106, is adjusted in the direction, A, and thus the engine torque will be increased. Correspondingly the engine torque will be decreased by adjusting the linkage, 106, in the direction B since in this way multiregional stratified air-fuel mixture will contain a decreasing fuel quantity and chemical energy. The linkage, 106, will thus be the engine throttle control for engine torque adjustment. The solenoid motor, 104, contains a solenoid, 109, acting, when energized, to pull the magnetic piston, 107, in the direction B, against the contrary force of both the spring, 110, and the compression of the air trapped in the volume, 112, between the upper face of the piston, 107, and the closely fit cylinder, 111. When the solenoid, 109, is de-energized the spring, 110, and the air pressure in the volume, 112, both act to move the magnetic piston, 107, in the direction A, and the piston will continue to move in this direction until stopped by the consequently increasing and oppositely acting force of the spring, 113, and the compression of the air trapped in the volume, 114, between the lower face of the piston, 107, and the closely fit cylinder, 111. Thereafter the piston, 107, and the moving element, 103, will oscillate back and forth along their axis of symmetry as a vibrating system. The amplitude of this oscillation, that is the total distance travelled by the magnetic piston between zero velocity points, would remain constant were it not for small friction losses. These small friction losses cause the amplitude of oscillation to gradually decrease and, in consequence, cause the maximum attained air pressure in the volume, 112, to also gradually decrease. When the maximum air pressure attained in the volume, 112, decreases below a certain point the pressure switch, 115, closes, causing the solenoid, 109, to be energized, thus pulling the magnetic piston, 107, strongly in the direction A and causing the pressure in the volume, 112, to rise sufficiently that the pressure switch, 115, then opens and de-energizes the solenoid, 109. In this way the amplitude of oscillation of the magnetic piston, 109, and the moving element, 103, of the valve, is restored to its full value. By correct setting of the actuation limits of the pressure switch, 115, the amplitude of oscillation can be kept within narrow limits and thus nearly constant. The pressure switch, 115, connects at its terminals x and y into the electrical circuit, sketched in FIG. 11, containing a battery, 116, the solenoid, 109, fixed contactors, 117, and 118, and the moveable contactor, 119.

Figure 11:
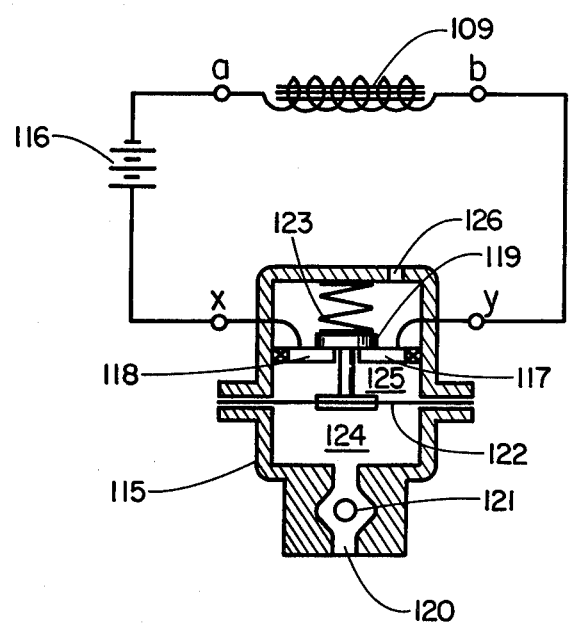

The air pressure in the volume, 112, acts via the passage, 120, and the check valve, 121, upon the diaphragm, 122, connected to the moveable contactor, 119, in a direction opposite to that of the closing spring, 123. The check valve, 121, is bled in such a way as to allow air under pressure to flow readily from passage, 120, into the sealed volume, 124, but to allow air to flow only very slowly from the volume, 124, back out of the passage, 120. Because of this bleeding arrangement of the check valve, 121, the pressure in the volume, 124, will be nearly equal to the maximum pressure attained in the volume, 112. The volume, 125, on the side of the diaphragm, 122, opposite the volume, 124, is vented to atmosphere via the vent passage, 126. As the maximum pressure attained in the volume, 112, decreases, due to decreased amplitude of oscillation of the magnetic piston, 107, and moving element, 103, the pressure in the volume, 124, also decreases, causing the closing spring, 123, to move the contactor, 119, towards the fixed contactors, 117, and 118. Eventually the moving contactor, 119, contacts the fixed contactors, 117, and 118, completing the circuit to energize the solenoid, 109. Energizing the solenoid, 109, causes the maximum pressure in the volume, 112, and hence also the volume, 124, to increase appreciably and this increased pressure, acting on the diaphragm, 122, acts to open the contactors, 117, 118 and 119 and thus to de-energize the solenoid, 109, and release the magnetic piston, 107, and moving element, 103, to oscillate. The pressure switch, 115, can also energize the solenoid, 109, indirectly via a relay, instead of directly as shown in FIG. 11, when a reduced current flow through the contactors of the pressure switch, 115, is preferable.

At various settings of the mean position of the moving element, 103, the moving ports, 105, will only partially open certain of the fixed ports, 102, and in this way the FIG. 10 form of this invention is a variable port area valve. The velocity of the moving element, 103, varies during each cycle of oscillation and, in consequence, the time during which the fixed ports, 102, are opened by the moving ports, 105, varies during each cycle and in this way the FIG. 10 form of this invention is a variable port open time valve. Hence the FIG. 10 form of this invention is an example of a variable port area and variable port open time valve.

The solenoid motor, described above, is only one method for driving the oscillating stratifier valve shown in FIG. 10. Other methods for driving the valve can also be used as, for example: an eccentric or cam driven from the engine crankshaft or camshaft or driven by an electric motor or air motor or vacuum motor; a piston and cylinder motor driven by compressed air or vacuum. The stratifier valve shown in FIG. 10 and FIG. 11, and described above, is only one example of a variable port area and port open time stratifier valve and it is not intended to limit this invention to this single example. Many different kinds of variable port area and port open time stratifier valves can be used to achieve the objects of this invention, as will be evident to a person skilled in the art, differing from the example shown in FIGS. 10 and 11 in many ways such as, the number and arrangement of fixed ports, the number and arrangement of moving ports, the manner in which the moving ports move relative to the fixed ports, the manner of driving the moving element of the valve, etc.

Another form of stratifier valve using an oscillating motion of the moving element can be used wherein the mean position of the moving element along its axis of oscillation is fixed and the amplitude of oscillation of the moving element is also fixed and a ported mask element is interposed between the moving element and the fixed ports in the housing. Adjustment of the mask element, via a connected control linkage, along the axis of oscillation can be used to change the group of fixed ports indexed by the moving ports and the mask ports.

For each of the various kinds of stratifier valve the fixed and moving ports, and mask ports if used, are preferably made of sufficient number and area and are so arranged that at least one fixed port is at least partially indexed by a moving port, and a mask port if used, at all positions which the moving element, and the mask element if used, can occupy within the housing. With this preferred porting requirement appreciable throttling of the intake air-fuel mixture can be avoided and thus the pumping power loss consequent upon throttling can also be avoided.

Having thus described the essential components and operation of the apparatus of this invention, one method of using this apparatus in order to achieve certain beneficial objects of this invention will next be described. One method of obtaining certain of the beneficial objects of this invention is to arrange that the types of regions of air-fuel mixture, in the multiregional stratified air-fuel mixture placed into the engine cylinder from the stratifier valve, differ in their weight ratio of air to fuel, and have different compression ignition time delay characteristics, and adjacent regions in the multiregional stratified mixture have different compression ignition time delay characteristics. For engines using spark ignition at least one of the types of regions should have a weight ratio of air to fuel within the spark ignitability limits (approximately between seven to one and twenty to one lbs. of air per lb. of fuel for most hydrocarbon fuels). The engine compression ratio should be adequate to insure compression ignition of that fuel containing region which has the longest compression ignition delay time, within at least the first portion of the expansion stroke. These arrangements can be accomplished in several ways as, for example, by adjusting the several separate air-fuel mixing devices, 16, in the several separate air-fuel mixing channels, 10, so that different weight ratios of air to fuel are created in different mixing channels, with no channel being richer in fuel than maximum power air-fuel ratio, all air-fuel mixing devices, 16, being supplied with the same fuel except an air only channel. It is evident that the regions will differ in their weight ratio of air to fuel and will also differ in their compression ignition time delay characteristic since, for the same fuel, this time delay increases as the mixture becomes leaner in fuel (higher weight ratio of air to fuel) than the maximum power air-fuel ratio. Since adjacent regions are selected from different channels by the stratifier valve they will surely differ than, not only in air-fuel ratio, but also in compression ignition time delay characteristic. If this particular method is used on a spark ignition engine the air-fuel mixing device, 16, on at least one of the air-fuel mixing channels, 10, is to be adjusted to mix air and fuel in a weight ratio within the spark ignitability limits of the fuel supplied to all the air-fuel mixing devices. A second method of accomplishing these arrangements is to use two different fuels, differing appreciable in their compression ignition time delay characteristics. One fuel, herein referred to as fuel A, is to have a long time delay at the mixture ratio of minimum compression ignition time delay, and the other fuel, herein referred to as fuel

B, is to have a short time delay at the mixture ratio of minimum compression ignition time delay. Some of the air-fuel mixing devices, 16, and hence some of the air-fuel mixing channels, 10, are supplied with fuel A, the remainder of the air-fuel mixing devices and air-fuel mixing channels being supplied with fuel B, except for an air only channel. The several air-fuel mixing devices, 16, in the several air-fuel mixing channels, 10, which are supplied with fuel A, are adjusted so that different weight ratios of air to fuel are created in different mixing channels with no channel being richer in fuel than maximum power air-fuel ratio. In similar fashion a variation in air-fuel ratio between channels is provided in those air-fuel mixing channels supplied with fuel B. For this second method it is evident that the types of regions of air-fuel mixture, in the multiregional stratified air-fuel mixture placed in the engine cylinder from the stratifier valve, will differ in their weight ratio of air to fuel and will differ in their compression ignition time delay characteristic. Most commonly adjacent regions will also differ in compression ignition time delay characteristic. It is however possible that a region containing fuel A could have the same compression ignition time delay as another region containing fuel B if these two regions differed appreciably in air-fuel ratio since the compression ignition time delay varies not only with fuel type but also with air-fuel ratio. The requirement that adjacent regions differ in compression ignition time delay can be satisfied, for the foregoing situation, by so connecting those air-fuel mixing channels whose compression ignition time delays do not differ that the stratifier valve does not place regions of these types adjacent to one another. It is evident that, for the foregoing situation, the stratifier valve must have more than two fixed ports. If this second particular method is used on a spark ignition engine the air-fuel mixing device, 16, on at least one of the air-fuel mixing channels, 10, is to be adjusted to mix air and fuel in a weight ratio within the spark ignitability limits of the fuel being supplied to that channel.

The second method of accomplishing these arrangements offers as one advantage over the first method described above that, for the same range of values of the air-fuel ratio among the regions, a wider range of values of the compression ignition time delay can be obtained and, in consequence, the engine can be run more quietly. An alternative advantage of the second method over the first method is that, for the same range of values of the compression ignition time delay among the regions, a higher proportion of the regions can be richer in fuel, and hence higher in chemical energy, and, in consequence a higher engine torque can be obtained. These advantages result from the fact that, to obtain a wide range of values of the compression ignition time delay from a single fuel requires that a wide range of air-fuel ratios be used and, hence, some of the regions must be very lean in fuel and hence very low in chemical energy. On the other hand, when two different fuels are used a very wide range of values of compression ignition time delay can be obtained even at the same air-fuel ratio. The foregoing advantages can evidently be further enhanced by using three or more fuels, differing as widely as desired in their respective compression ignition time delay characteristics. The primary disadvantage of using more than one fuel is the increased mechanical and operational complexity of a multifueled engine assembly. The best number of different fuels and range of values of air-fuel ratio will vary for each engine application.

Techniques of preparing fuels which differ in their compression ignition time delay characteristics are already well known in the art.

When an engine of this invention is arranged, as described above, so that the types of regions of air-fuel mixture, in the multiregional stratified air-fuel mixture going into the engine cylinder from the stratifier valve, differ in their weight ratio of air to fuel, and have different compression ignition time delay characteristics, and adjacent regions in the multiregional stratified mixture have different compression ignition time delay characteristics, the combustion process taking place following compression can be altogether different from the combustion processes used in engines of the prior art. Certain of the beneficial objects of this invention, especially those relating to reduction of emissions, are achieved by use of this new and different combustion process. Preferably this multiregional stratified air-fuel mixture in the engine cylinder is both spark ignited and compression ignited. The air-fuel mixture being ignited and burned is composed of many different regions differing in air-fuel ratio and in compression ignition delay time, any one region being essentially uniform. Some regions are spark ignited and burn with a normal flame whereas other regions are compression ignited and burn in a manner which creates strong pressure waves. Since the stratified air-fuel mixture is composed of many different regions, ignition, combustion, and energy release occurs at different times in different regions. In consequence, the several pressure waves created by compression ignition of several regions occur at different times and travel in different directions and do not act together to increase engine noise. This time and position dispersed occurrence of compression ignition in the multiregional stratified air-fuel mixture is similar in noise suppression characteristics to the time and position dispersed compression ignition occuring in the heterogeneous mixture of the diesel engine. Hence an engine using the apparatus of this invention can be made as quiet running as desired by increase of the number of types of regions and the total number of regions and this is one of the beneficial objects of this invention. Reduction of engine torque is accomplished by introducing a greater proportion of air only regions and fuel leans regions into the multiregional stratified air-fuel mixture and throttling is not needed. Hence the efficiency loss due to pumping is avoided and this is another beneficial object of this invention. Since compression ignition is utilized engine compression ratio and efficiency can be increased, for fuels of moderate, readily available octane numbers, over the knocking limit prevailing for the gasoline engine and this efficiency gain is another beneficial object of this invention. The overall air-fuel ratio of the multiregional stratified air-fuel mixture can be very lean in fuel under conditions of less than maximum torque and undesirable emmissions of unburned hydrocarbons as well as of carbon monoxide and oxides of nitrogen will be reduced thereby. These reductions of exhaust emmissions of unburned hydrocarbons, carbon monoxide and oxides of nitrogen are another beneficial object of this invention. The volume and fuel weight in the thin film of unburned air-fuel mixture next to the combustion chamber surface can be reduced because some portions thereof will be compression ignited and this process is not subject to arrest by chilling as is the normal flame. Hence exhaust emmissions of unburned hydrocarbons will be further reduced by this means and this is another beneficial object of this invention. Since all of the fuel is evaporated and all zones are individually homogeneous and not over rich no exhaust smoke emmissions will result as is the case for the diesel engine and this is another beneficial object of this invention. The apparatus of this invention utilizes low cost air-fuel mixing devices, such as carburetors, which are less expensive to manufacture and maintain than the fuel injection systems used on diesel engines and this is another beneficial object of this invention.

Having thus described my invention and how various beneficial objects may be achieved by use of my invention what I claim as new and desire to secure by letters patent is:

1. The combination of an internal combustion engine, adapted for operation with intake air fuel mixtures, wherein the improvement comprises replacing the fuel supply, torque control, and air fuel mixing equipment of said internal combustion engine with apparatus comprising;

means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;

means for sequentially connecting the intake pipe of the engine to said separate air fuel channels one set of channels at a time, in a plurality of sequence of said connectings to sets of channels for each engine cycle, each such connecting in said sequence differing from the preceding connecting so that, within the multiregional stratified air fuel mixture thusly created in the intake pipe of the engine, any two adjacent air fuel mixture regions therein come from different air fuel mixture channels;

means for changing said sequence of connectings, while the engine is running, so that said multiregional stratified air fuel mixture in the engine intake pipe is changed.

2. The combination of an internal combustion engine, adapted for operation with intake air fuel mixtures, wherein the improvement comprises replacing the fuel supply, torque control, and air fuel mixing equipment of said internal combustion engine with apparatus comprising;

means for creating differing gaseous air fuel mixtures in each of at least five separate air fuel channels, the values of the ratio of fuel of air lying between infinity and zero and preferably between 20 percent richer in fuel than the chemically correct fuel to air ratio and a fuel to air ratio of zero;

means for sequentially connecting the intake pipe of the engine to said several separate air fuel channels one set of channels at a time, in a plurality of sequences of said connectings to sets of channels for each engine cycle, each such connecting in said sequence differing from the preceding connecting so that, within the multiregional stratified air fuel mixture thusly created in the intake pipe of the engine, any two adjacent air fuel mixture regions therein come from different air fuel mixture channels;

means for changing said sequence of connectings, while the engine is running, so that said multiregional stratified air fuel mixture in the engine intake pipe is changed.

3. The combination of an internal combustion engine, adapted for operation with intake air fuel mixtures, wherein the improvement comprises replacing the fuel supply, torque control, and air fuel mixing equipment of said internal combustion engine with apparatus comprising;

means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;

means for sequentially connecting the intake pipe of the engine to said separate air fuel channels, one set of channels at a time, in a plurality of sequences of said connectings to sets of channels for each engine cycle, each such connecting in said sequence differing from the preceding connecting in that at least one connecting means connects to a different channel than that channel just previously connected thereto, this limitation on successive connectings being applicable to at least one and preferably all of the connecting means, but not being applicable to connectings with any channel whose ratio of fuel to air is zero;

means for changing said sequence of connectings, while the engine is running;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

4. The combination of an internal combustion engine, adapted for operation with intake air fuel mixtures, wherein the improvement comprises replacing the fuel supply, torque control, and air fuel mixing equipment of said internal combustion engine with apparatus comprising;

means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;

means for sequentially connecting the intake pipe of the engine to said separate air fuel channels, one set of channels at a time, in a plurality of sequences of said connectings to sets of channels for each engine cycle, each such connecting in said sequence differing from the preceding connecting in that at least one connecting means connects to a different channel than that channel just previously connected thereto, and each such connecting in said sequence differing also from the preceding connecting in that those connecting means which next connect, are next adjacent to and will continue to be next adjacent to said preceding connecting of said one connecting means shall connect with a different channel than that just previously connected by said one connecting means, these limitations on successive connectings being applicable to at least one and preferably all of the connecting means but not being applicable to connectings with any channel whose ratio of fuel to air is zero;

means for changing said sequence of connectings while the engine is running;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

5. The combination of an internal combustion engine, adapted for operation with intake air fuel mixtures, wherein the improvement comprises replacing the fuel supply, torque control and air fuel mixing equipment of said internal combustion engine with apparatus comprising;

means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;

means for sequentially connecting the intake pipe of the engine to said separate air fuel channels one set of channels at a time, in a plurality of sequences of said connectings to sets of channels for each engine cycle, where more than one connecting means is used at least one connecting means shall be connected with a channel different from those connected with by connecting means adjacent to said one connecting means, this limitation on adjacent connectings being applicable to at least one and preferably all of the connecting means but not being applicable to connectings with any channel whose ratio of fuel to air is zero, each such connecting in said sequence differing from the preceding connecting in that at least one connecting means connects to a different channel than that channel just previously connected thereto, and each such connecting in said sequence differing also from the preceding connecting in that those connecting means which next connect, are next adjacent to and will continue to be next adjacent to said preceding connecting of said one connecting means shall connect with a different channel than that just previously connected by said one connecting means, these limitations on successive connectings being applicable to at least one and preferably all of the connecting means but not being applicable to connectings with any channel whose ratio of fuel to air is zero;

means for changing said sequence of connectings, while the engine is running;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

6. The combination of an internal combustion engine, adapted for operation with intake air fuel mixtures, wherein the improvement comprises replacing the fuel supply, torque control, and air fuel mixing equipment of said internal combustion engine with apparatus comprising;

means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;

means for sequentially connecting the intake pipe of the engine to said separate air fuel channels, one set of channels at a time, in a plurality of sequences of said connectings to sets of channels for each engine cycle, where more than one connecting means is used at least one connecting means shall be connected with a channel different from those connected with by connecting means adjacent to said one connecting means, this limitation on adjacent connectings being applicable to at least one and preferably all of the connecting means but not being applicable to connectings with any channel whose ratio of fuel to air is zero, each such connecting in said sequence differing from the preceding connecting in that at least one connecting means connects to a different channel than that channel just previously connected thereto, this limitation on successive connectings being applicable to at least one and preferably all of the connecting means but not being applicable to connectings with any channel whose ratio of fuel to air is zero;

means for changing said sequence of connectings, while the engine is running;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

7. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising;

means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;

means for sequentially connecting the intake pipe of the engine to said separate air fuel channels one set of channels at a time, in a plurality of sequences of said connectings to sets of channels for each engine cycle, each such connecting in said sequence differing from the preceding connecting so that, within the multiregional stratified air fuel mixture thusly created in the intake pipe of the engine, any two adjacent air fuel mixture regions therein come from different air fuel mixture channels;

means for changing said sequence of connectings, while the engine is running, so that said multiregional stratified air fuel mixture in the engine intake pipe is changed.

8. The combination of a compression ignition internal combustion engine adapted for operation with air fuel mixtures at intake, wherein the improvement comprises replacing the fuel supply, torque control, and air fuel mixing equipment of said internal combustion engine with apparatus comprising;
  means for creating differing gaseous air fuel mixtures in each of at least five separate air fuel channels, the values of the ratio of fuel of air lying between infinity and zero and preferably between 20 percent richer in fuel than the chemically correct fuel to air ratio and a fuel to air ratio of zero;
  means for sequentially connecting the intake pipe of the engine to said several separate air fuel channels one set of channels at a time in a plurality of sequences of said connectings to sets of channels for each engine cycle, each such connecting in said sequence differing from the preceding connecting so that, within the multiregional stratified air fuel mixture thusly created in the intake pipe of the engine, any two adjacent air fuel mixture regions therein come from different air fuel mixture channels;
  means for changing said sequence of connectings, while the engine is running, so that said multiregional stratified air fuel mixture in the engine intake pipe is changed.

9. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising;
  means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;
  means for sequentially connecting the intake pipe of the engine to said separate air fuel channels, one set of channels at a time, in a plurality of sequence of said connectings to sets of channels for each engine cycle, each such connecting in said sequence differing from the preceding connecting in that at least one connecting means connect to a different channel than that channel just previously connected thereto, this limitation on successive connectings being applicable to at least one and preferably all of the connecting means, but not being applicable to connectings with any channel whose ratio of fuel to air is zero;
  means for changing said sequence of connectings, while the engine is running;
  whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

10. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising;
  means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;
  means for sequentially connecting the intake pipe of the engine to said separate air fuel channels, one set of channels at a time, in a plurality of sequences of said connectings to sets of channels for each engine cycle, each such connecting in said sequence differing from the preceding connecting in that at least one connecting means connects to a different channel than that channel just previously connected thereto, and each such connecting in said sequence differing also from the preceding connecting in that those connecting means which next connect, are next adjacent to and will continue to be next adjacent to said preceding connecting of said one connecting means shall connect with a different channel than that just previously connected by said one connecting means, these limitations on successive connectings being applicable to at least one and preferably all of the connecting means but not being applicable to connectings with any channel whose ratio of fuel to air is zero;
  means for changing said sequence of connectings, while the engine is running;
  whereby a multiregional stratified air fuel mixture is created in the intake pipe of said internal combustion engine, and the pattern of differing regions of air fuel mixture and air as well as the number of different types of regions in said multiregional air fuel mixture can be changed in order to change the operation of the engine, as to change the power output.

11. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising;
  means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;
  means for sequentially connecting the intake pipe of the engine to said separate air fuel channels one set of channels at a time, in a plurality of sequences of said connectings to sets of channels for each engine cycle, where more than one connecting means is used at least one connecting means shall be connected with a channel different from those connected with by connecting means adjacent to said one connecting means, this limitation on adjacent connectings being applicable to at least one and preferably all of the connecting means but not being applicable to connectings with any channel whose ratio of fuel to air is zero, each such connecting in said sequence differing from the preceding connecting in that at least one connecting means connects to a different channel than that channel just previously connected thereto, and each such connecting in said sequence differing also from the preceding connecting in that those connecting means which next connect, are next adjacent to and will continue to be next adjacent to said preceding connecting of said one connecting means shall connect with a different channel than that just previously connected by said one connecting means, these limitations on successive connectings being applicable to at least one and preferably all of the connecting means but not being applicable to connectings with any channel whose ratio of fuel to air is zero;

means for changing said sequence of connectings, while the engine is running;

whereby a multiregional stratified air fuel mixture is created in the intake pipe of said internal combustion engine, and the pattern of differing regions of air fuel mixture and air as well as the number of different types of regins in said multiregional stratified air fuel mixture can be changed in order to change the operation of the engine, as to change the power output.

12. The combination of a compression ignition internal combustion engine, adapted for operation with air fuel mixtures at intake, wherein the improvement comprises replacing the fuel supply, torque control and air fuel mixing equipment of said internal combustion engine with apparatus comprising;

means for creating differing gaseous air fuel mixtures in each of a plurality of separate air fuel channels, the values of the ratio of fuel to air lying between infinity and zero and preferably between 20 percent richer in fuel than the chemically correct fuel to air ratio and a fuel to air ratio of zero;

means for sequentially connecting the intake pipe of the engine to said separate air fuel channels, one set of channels at a time, in a plurality of sequence of said connectings to sets of channels for each engine cycle, where more than one connecting means is used at least one connecting mean shall be connected with a channel different from those connected with by connecting means adjacent to said one connecting means, this limitation on adjacent connectings being applicable to at least one and preferably all of the connecting means but not being applicable to connectings with any channel whose ratio of fuel to air is zero, each such connecting in said sequence differing from the preceding connecting in that at least one connecting means connects to a different channel than that channel just previously connected thereto, this limitation on successive connectings being applicable to at least one and preferably all of the connecting means but not being applicable to connectings with any channel whose ratio of fuel air is zero;

means for changing said sequence of connectings, while the engine is running;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

13. The combination of an internal combustion engine, adapted for operation with intake air fuel mixtures wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whoes ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, so that during said time ordered sequence of indexings of open fixed ports with moving ports during each engine cycle, at least three different channels will have been connected to the engine intake pipe, and said engine intake pipe connection will have changed from one channel to a different channel at least seven times;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

14. The combination of an internal combustion engine, adapted for operation with intake air fuel mixtures wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, where more than one moving port is used several open fixed ports may be indexed simultaneously by different moving ports and for a plurality and preferably all of such simultaneous indexings said several open, simultaneously indexed fixed ports shall each connect separately to different channels, so that during said time ordered sequence of indexings of open fixed ports with moving ports during each engine cycle, at least three different channels will have been connected to the engine intake pipe, and said engine intake pipe connection will have changed from one channel to a different channel at least seven times, and a plurality of simultaneous connections of the engine intake pipe to channels by more than one moving port shall be to different channels;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional straitified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

15. The combination of an internal combustion engine, adapted for operation with intake air fuel mixtures wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, where more than one moving port is used several open fixed ports may be indexed simultaneously by different moving ports and for a plurality and preferably all of such simultaneous indexings said several open, simultaneously indexed fixed ports shall each connect separately to different channels, a plurality and preferably all of those open fixed ports indexed in succession by adjacent moving ports shall each connect separately to different channels, so that during said time ordered sequence of indexings of open fixed ports with moving ports during each engine cycle, at least three different channels will have been connected to the engine intake pipe, and said engine intake pipe connection will have changed from one channel to a different channel at least seven times, and a plurality of simultaneous connections of the engine intake pipe to channels by more than one moving port shall be to different channels, and a plurality of successive connections of the engine intake pipe to channels by adjacent moving ports shall be to different channels;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

16. The combination of an internal combustion engine, adapted for operation with intake air fuel mixtures wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, a plurality and preferably all of those open fixed ports indexed in succession by adjacent moving ports shall each connect separately to different channels, so that during said time ordered sequence of indexings of open fixed ports with moving ports during each engine cycle, at least three different channels will have been connected to the engine intake pipe, and said engine intake pipe connection will have changed from one channel to a different channel at least seven times, and a plurality of successive connections of the engine intake pipe to channels by adjacent moving ports shall be to different channels;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

17. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least two different channels and preferably more than two different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral five less the number of channels which are connected to by more than one moving port during said sequence, so that during said time ordered sequence of indexings of open fixed ports with moving ports during each engine cycle, at least three different channels will have been connected to the engine intake pipe, and said engine intake pipe connection will have changed from one channel to a different channel at least five times;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

18. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least two different channels and preferably more than two different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral five less the number of channels which are connected to by more than one moving port during said sequence, where more than one moving port is used several open fixed ports may be indexed simultaneously by different moving ports and for a plurality and preferably all of such simultaneous indexings said several open, simultaneously indexed fixed ports shall each connect separately to different channels, so that during said time ordered sequence of indexings of open fixed ports with moving ports during each engine cycle, at least three different channels will have been connected to the engine intake pipe, and said engine intake pipe connection will have changed from one channel to a different channel at least five times, and a plurality of simultaneous connections of the engine intake pipe to channels by more than one moving port shall be to different channels;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

19. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said statifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least two different channels and preferably more than two different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral five less the number of channels which are connected to by more than one moving port during said sequence, where more than one moving port is used several open fixed ports may be indexed simultaneously by different moving ports and for a plurality and preferably all of such simultaneous indexing said several open, simultaneously indexed fixed ports shall each connect separately to different channels, a plurality and preferably all of those open fixed ports indexed in succession by adjacent moving ports shall each connect separately to different channels; so that during said time ordered sequence of indexings of open fixed ports with moving ports during each engine cycle, at least three different channels will have been connected to the engine intake pipe, and said engine intake pipe connection will have changed from one channel to a different channel at least five times, and a plurality of simultaneous connections of the engine intake pipe to channels by more than one moving port shall be to different channels, and a plurality of successive connections of the engine intake pipe to channels by adjacent moving ports shall be to different channels;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

20. The combination of a compression ignition internal combustion engine, adapted for operation with air fuel mixtures at intake, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least two different channels and preferably more than two different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral five less the number of channels which are connected to by more than one moving port during said sequence, a plurality and preferably all of those open fixed ports indexed in succession by adjacent moving ports shall each connect separately to different channels, so that during said time ordered sequence of indexings of open fixed ports with moving ports during each engine cycle, at least three different channels will have been connected to the engine intake pipe, and said engine intake pipe connection will have changed from one channel to a different channel at least five times, and a plurality of successive connections of the engine intake pipe to channels by adjacent moving ports shall be to different channels;

means for changing the time ordered sequence of indexings of fixed ports with said moving ports of the moving element for each engine cycle while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

21. The combination of an internal combustion engine, adapted for operation with intake air fuel mixtures, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, that entire batch of open fixed ports thusly indexable by all of the moving ports in the moving element shall be thusly indexed a plurality of times during each engine cycle, so that during said time ordered sequence of indexings of open fixed ports with moving ports during each engine cycle, at least three different channels will have been connected to the engine intake pipe, and said engine intake pipe connection will have changed from one channel to a different channel at least fourteen times;

means for changing the time ordered sequence of indexings of fixed ports with said moving ports of the moving element while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

22. The combination of an internal combustion engine, adapted for operation with intake air fuel mixtures, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, where more than one moving port is used several open fixed ports may be indexed simultaneously by different moving ports and for a plurality and preferably all of such simultaneous indexings said several open, simultaneously indexed fixed ports shall each connect separately to different channels, that entire batch of open fixed ports thusly indexable by all of the moving ports in the moving element shall be thusly indexed a plurality of times during each engine cycle, so that during said time ordered sequence of indexings of open fixed ports with moving ports during each engine cycle, at least three different channels will have been connected to the engine intake pipe, and said engine intake pipe connection will have changed from one channel to a different channel at least fourteen times, and a plurality of simultaneous connections of the engine intake pipe to channels by more than one moving port shall be to different channels;

means for changing the time ordered sequence of indexing of fixed ports with said moving ports of the moving element while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of differing regions of air fuel mixture and air as well as the number of different types of regions in said multiregional stratified air fuel mixture can be changed in order to change the operation of the engine, as to change the power output.

23. The combination of an internal combustion engine, adapted for operation with intake fuel mixtures, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connectng the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, where more than one moving port is used several open fixed ports may be indexed simultaneously by different moving ports and for a plurality and preferbly all of such simultaneous indexings said several open, simultaneously indexed fixed ports shall each connect separately to different channels, a plurality and preferably all of those open fixed ports indexed in succession by adjacent moving ports shall each connect separately to different channels, that entire batch of open fixed ports thusly indexable by all of the moving ports in the moving element shall be thusly indexed a plurality of times during each engine cycle, so that during said time ordered sequence of indexings of open fixed ports with moving ports during each engine cycle, at least three different channels will have been connected to the engine intake pipe, and said engine intake pipe connection will have changed from one channel to a different channel at least fourteen times, and a plurality of simultaneous connections of the engine intake pipe to channels by more than one moving port shall be to different channels, and a plurality of successive connections of the engine intake pipe to channels by adjacent moving ports shall be to different channels;

means for changing the time ordered sequence of indexings of fixed ports with said moving ports of the moving element while the engine is running;

at least one such stratifier valve being required for each separate intake pipe of an internal combustion engine independently of the number of engine cylinders connecting to said separate engine intake pipe;

means for moving the moving element of said stratifier valve through its sequence of port indexings during each engine cycle;

whereby a multiregional stratified air fuel mixture is created in the intake pipe of said internal combustion engine, and the pattern of different regions of air fuel mixture and air as well as the number of different types of regions in said multiregional stratified air fuel mixture can be changed in order to change the operation of the engine, as to change the power output.

24. The combination of an internal combustion engine, adapted for operation with intake air fuel mixtures, wherein the improvement comprises replacing the fuel supply, torque control, and air fuel mixing equipment of said internal combustion engine with apparatus comprising, a number of separate air fuel channels, stratifier valve containing a moving element, means for moving said moving element;

said air fuel channels being a plurality in number, said air fuel channels being designed and adjusted to produce differing air fuel mixtures whose ratio of fuel to air shall be between infinity and zero and preferably between 20 percent richer in fuel than the chemically correct fuel to air ratio and a fuel to air ratio of zero, those air fuel channels which are supplied with a fuel being fitted with a fuel air mixing device followed in the flow direction by a heating section adequate to evaporate liquid fuel, those air fuel channels supplied with the same kind of fuel being designed and adjusted to produce different fuel to air ratios, at least one kind of fuel and preferably a plurality of kinds of fuel being used;

said stratifier valve having separate connections and fixed valve ports for each of the air fuel channels, each individual fixed valve port being connected to but a single air fuel channel, said stratifier valve being interposed between these several channels and the intake pipe of the engine, said stratifier valve containing a moving element with moving ports, said moving ports connecting the intake pipe of the engine to the fixed ports when indexed therewith, the motion of a moving port sweeping out an indexable path area for that moving port for each engine cycle, and fixed ports being positioned within this indexable path area and opened in order to index in a time ordered sequence with that moving port during said engine cycle, the whole group of open fixed ports indexable by one moving port shall have connections to at least three different channels and preferably more than three different channels, and this requirement as to the number of channels connected to by the whole group of open fixed ports indexable by one moving port shall be met by at least one and preferably a plurality of all the moving ports, that entire batch of open fixed ports indexable in a time ordered sequence for an engine cycle by all of the moving ports in the moving element shall have connections to a number of different channels at least equal to and preferably more than the numeral seven less the number of channels which are connected to by more than one moving port during said sequence, a plurality and preferably all of those open fixed ports indexed in succession by adjacent moving ports shall each connect separately to different channels, that entire batch of open fixed ports thusly indexable by all of the moving ports in the moving element shall be thusly indexed a plurality of times during each engine cycle, so that during said time ordered sequence of indexings of open fixed ports with moving ports during each engine cycle, at least three different channels will have been connected to the engine intake pipe, and said engine intake pipe connection will have changed from one channel to a different channel at least fourteen times, and a plurality of successive connections of the engine intake pipe to channels by adjacent moving ports shall be to different channels;

means for changing the time ordered sequence of indexings of fixed ports with said moving ports of the moving element while the engine is running;

at least one such stratifier valve being required for each separate intake pipe of an internal combustion engine independently of the number of engine cylinders connecting to said separate engine intake pipe;

means for moving the moving element of said stratifier valve through its sequence or port indexings during each engine cycle;

whereby a multiregional stratified air fuel mixture is created in the intake pipe of said internal cobustion engine, and the pattern of differing regions of air fuel mixture and air as well as the number of different types of regions in said multiregional stratified air fuel mixture can be changed in order to change the operation of the engine, as to change the power output.

25. The combination of an internal combustion engine, adapted for operation with intake air fuel mixtures as recited in claim 22, wherein said stratifier valve is a variable port area stratifier valve;

said variable port area stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the area of each fixed port uncovered by said moving ports may be varied from none to wide open, by adjustment of a control linkage, in order to change the pattern of differing regions of air fuel mixtures and air, as well as to change the number of different types of regions in the multiregional stratified air fuel mixture going to the engine intake, in order to change the operation of the engine.

26. The combination of an internal combustion engine, adapted for operation with intake air fuel mixtures as recited in claim 23, wherein said stratifier valve is a variable port area stratifier valve;

said variable port area stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the area of each fixed port uncovered by said moving ports may be varied from none to wide open, by adjustment of a control linkage, in order to change the pattern of differing regions of air fuel mixtures and air, as well as to change the number of different types of regions in the multiregional stratified air fuel mixtures going to the engine intake, in order to change the operation of the engine.

27. The combination of an internal combustion engine, adapted for operation with intake air fuel mixtures as recited in claim 22, wherein said stratifier valve is a variable port open time stratifier valve;

said variable port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port from none to the maximum time interval and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

28. The combination of an internal combustion engine, adapted for operation with intake air fuel mixtures as recited in claim 23, wherein said stratifier valve is a variable port open time stratifier valve;

said variable port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port from none to the maximum time interval and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

29. The combination of an internal combustion engine, adapted for operation with intake air fuel mixtures as recited in claim 22, wherein said stratifier valve is a variable port area and port open time stratifier valve;

said variable port area and port open time stratifier valve having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the time interval during which a particular fixed port is uncovered by a moving port and also the area of a particular fixed port uncovered by a moving port, may be varied from none to maximum by adjustment of a control linkage, in order to change the pattern of differing regions of air fuel mixtures and air, as well as to change the number of different types of regions in the multiregional stratified air fuel mixture going to the engine intake, in order to change the operation of the engine.

30. The combination of an internal combustion engine, adapted for operation with intake air fuel mixtures as recited in claim 23, wherein said stratifier valve is a variable port area and port open time stratifier valve;

said variable port area and port open time stratifier valve having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the time interval during which a particular fixed port is uncovered by a moving port and also the area of a particular fixed port uncovered by a moving port, may be varied from none to maximum by adjustment of a control linkage, in order to change the pattern of differing regions of air fuel mixtures and air, as well as to change the number of different types of regions in the multiregional stratified air fuel mixture going to the engine intake, in order to change the operation of the engine.

31. The combination of an internal combustion engine, adapted for operation with intake air fuel mixtures as recited in claim 22, wherein said stratifier valve is a variable port area and port open time stratifier valve;

said variable port area and port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an ports at a time, in a time ordered sequence for each cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a mving port and also the area of a particular fixed port uncovered by a moving from none to the maximum and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

32. The combination of an internal combustion engine, adapted for operation with intake air fuel mixtures as recited in claim 23, wherein said stratifier valve is a variable port area and port open time stratifier valve;

said variable port area and port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port and also the area of a particular fixed port uncovered by a moving port from none to the maximum and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

33. The combination of a compression ignition internal combustion engine, adapted for operation with air fuel mixtures at intake, as recited in claim 17, wherein said stratifier valve is a variable port area stratifier valve;

said variable port area stratifier valve, having a separate connection and fixed ports for each of the air fuel channels and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the area of each fixed port uncovered by said moving ports may be varied from none to wide open, by adjustment of a control linkage, in order to change the pattern of differing regions of air fuel mixtures and air, as well as to change the number of different types of regions in the multiregional stratified air fuel mixture going to the engine intake, in order to change the operation of the engine.

34. The combination of a compression ignition internal combustion engine, adapted for operation with air fuel mixtures at intake, as recited in claim 18, wherein said stratifier valve is a variable port area stratifier valve;
said variable port area stratifier valve, having a separate connection and fixed ports for each of the air fuel channels, and being intersaid stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the area of each fixed port uncovered by said moving ports may be varied from none to wide open, by adjustment of a control linkage, in order to change the pattern of differing regions of air fuel mixtures and air, as well as to change the number of different types of regions in the multiregional stratified air fuel mixture going to the engine intake, in order to change the operation of the engine.

35. The combination of a compression ignition internal combustion engine, adapted for operation with air fuel mixtures at intake, as recited in claim 19, wherein said stratifier valve is a variable port area stratifier valve;
said variable port area stratifier valve, having a separate connection and fixed ports for each of the air channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the area of each fixed port uncovered by said moving ports may be varied from none to wide open, by adjustment of a control linkage, in order to change the pattern of differing regions of air fuel mixtures and air, as well as to change the number of different types of regions in the multiregional stratified air fuel mixture going to the engine intake, in order to change the operation of the engine.

36. The combination of a compression ignition internal combustion engine, adapted for operation with air fuel mixtures at intake, as recited in claim 17, wherein said stratifier valve is a variable port open time stratifier valve;
said variable port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence, for each engine cycle, and adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port from none to the maximum time interval and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

37. The combination of a compression ignition internal combustion engine, adapted for operation with air fuel mixtures at intake, as recited in claim 18, wherein said stratifier valve is a variable port open time stratifier valve;
said variable port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portions of a fixed port opened by a mask port and hence changing the time interval during which a particular fixed port is uncovered by a moving port from none to the maximum time interval and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change to operation of the engine.

38. The combination of a compression ignition internal combustion engine, adapted for operation with air fuel mixtures at intake, as recited in claim 19, wherein said stratifier valve is a variable port open time stratifier valve;
said variable port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port from none to the maximum time interval and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

39. The combination of a compression ignition internal combustion engine, adapted for operation with air fuel mixtures at intake, as recited in claim 17, wherein said stratifier valve is a variable port area and port open time stratifier valve;

said variable port area and port open time stratifier valve having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the time interval during which a particular fixed port is uncovered by a moving port and also the area of a particular fixed port uncovered by a moving port, may be varied from none to maximum by adjustment of a control linkage, in order to change the pattern of differing regions of air fuel mixtures and air, as well as to change the number of different types of regions in the multiregional stratified air fuel mixture going to the engine intake, in order to change the operation of the engine.

40. The combination of a compression ignition internal combustion engine, adapted for operation with air fuel mixtures at intake, as recited in claim 18, wherein said stratifier valve is a variable port area and port open time stratifier valve;

said variable port area and port open time stratifier valve having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, the moving ports in the moving element being adjustable, while the engine is running, as to their position relative to the fixed ports, so that the time interval during which a particular fixed port is uncovered by a moving port and also the area of a particular fixed port uncovered by a moving port, may be varied from none to maximum by adjustment of a control linkage, in order to change the pattern of differing regions of air fuel mixtures and air, as well as to change the number of different types of regions in the multiregional stratified air fuel mixture going to the engine intake, in order to change the operation of the engine.

41. The combination of a compression ignition internal combustion engine, adapted for operation with air fuel mixtures at intake, as recited in claim 19, wherein said stratifier valve is a variable port area and port open time stratifier valve;

said variable port area and port open time stratifier valve having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting the several air fuel channels, one set of ports at a time, in a time ordered sequence for each engine cycle, the moving ports in the moving element being adjustable, while the engine is running, as to their position relative to the fixed ports, so that the time interval during which a particular fixed ports is uncovered by a moving port and also the area of a particular fixed port uncovered by a moving port, may be varied from none to maximum by adjustment of a control linkage, in order to change the pattern of differing regions of air fuel mixtures and air, as well as to change the number of different types of regions in the multiregional stratified air fuel mixture going to the engine intake, in order to change the operation of the engine.

42. The combination of a compression ignition internal combustion engine, adapted for operation with air fuel mixtures at intake, as recited in claim 17, wherein said stratifier valve is a variable port area and port open time stratifier valve;

said variable port area and port open time stratifier valve, having a separate connection and fixed ports for each of the air fuel channels and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port and also the area of a particular fixed port uncovered by a moving port from none to the maximum and being thusly adjustably by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

43. The combination of a compression ignition internal combustion engine, adapted for operation with air fuel mixtures at intake, as recited in claim 18, wherein said stratifier valve is a variable port area and port open time stratifier valve;

said variable port area and port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port and also the area of a particular fixed port uncovered by a moving port from none to the maximum and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

44. The combination of a compression ignition internal combustion engine, adapted for operation with air fuel mixtures at intake, as recited in claim 19, wherein said stratifier valve is a variable port area and port open time stratifier valve;

said variable port area and port open time stratifier valve, having a separate connection and fixed ports for each of the air fuel channels, and being interposed between these several channels and the intake pipe of the engine, said stratifier valve containing a ported moving element with moving ports which connects the intake pipe of the engine to some of the fixed ports connecting to the several air fuel channels, one set of ports at a time, in a time ordered sequence for each engine cycle, an adjustable ported mask element being sealably interposed between the fixed ports and the moving ports, adjustment of said adjustable ported mask element changing the portion of a fixed port opened by a mask port and hence changing the time interval during which a particular fixed port is uncovered by a moving port and also the area of a particular fixed port uncovered by a moving port from none to the maximum and being thusly adjustable by adjustment of a control linkage connected thereto in order to change the pattern of differing regions of air fuel mixtures and air, as well as to change the number of different types of regions, in the multiregional stratified air fuel mixture going to the engine intake, in order to change the operation of the engine.

* * * * *